US012051047B2

(12) United States Patent
Dedes

(10) Patent No.: US 12,051,047 B2
(45) Date of Patent: Jul. 30, 2024

(54) ARTIFICIAL INTELLIGENCE MONITORING, NEGOTIATING, AND TRADING AGENTS FOR AUTONOMOUS VEHICLES

(71) Applicant: DGNSS SOLUTIONS, LLC, Powell, OH (US)

(72) Inventor: George Dedes, Powell, OH (US)

(73) Assignee: DGNSS SOLUTIONS, LLC, Powell, OH (US)

( * ) Notice: Subject to any disclaimer, the term of this patent is extended or adjusted under 35 U.S.C. 154(b) by 761 days.

(21) Appl. No.: 16/842,146

(22) Filed: Apr. 7, 2020

(65) Prior Publication Data

US 2021/0312406 A1 Oct. 7, 2021

(51) Int. Cl.
*G06Q 10/20* (2023.01)
*G06N 3/04* (2023.01)
*G07C 5/00* (2006.01)

(52) U.S. Cl.
CPC .............. *G06Q 10/20* (2013.01); *G06N 3/04* (2013.01); *G07C 5/008* (2013.01)

(58) Field of Classification Search
None
See application file for complete search history.

(56) References Cited

U.S. PATENT DOCUMENTS 10,042,359 B1 * 8/2018 Konrardy ............. G05D 1/0212
10,567,237 B1 * 2/2020 Powell .................... H04L 41/14

(Continued)

FOREIGN PATENT DOCUMENTS

EP       3543918 A1 * 3/2018 ............... G06N 3/08
WO   WO0229696 A1 * 4/2002 ............. G06F 17/60

(Continued)

OTHER PUBLICATIONS

Beam, Carrie, and Arie Segev. "Automated negotiations: A survey of the state of the art." Wirtschaftsinformatik 39.3 (1997): 263-268. (Year: 1997).*

(Continued)

*Primary Examiner* — Paul R Fisher
(74) *Attorney, Agent, or Firm* — HAUPTMAN HAM, LLP

(57) ABSTRACT

A system for autonomous vehicle Artificial Intelligence (AI) platform consisting of 1) AI "health monitoring AI agent(s)" monitoring the health of parts of the "autonomous vehicles" or "manually driven vehicles" or the health of the entire "autonomous" or "manually-driven" vehicles; 2) e-commerce AI "negotiating" agents, including the back-end and the cloud computing infrastructure required for the AI agents working on behalf of the "autonomous" or manually-driven vehicles to find the best possible price through negotiations, auctions or futures trading for new or used "autonomous vehicles", "autonomous vehicle" replacement parts, "autonomous vehicle" fuel, and/or "autonomous Vehicle" service providers; and 3) e-commerce AI "negotiating" agents, including the back-end and the cloud computing infrastructure required for the AI agents working on behalf of sellers to offer the best possible price through negotiations, auctions or futures trading for new or used "autonomous vehicles", "autonomous vehicle" replacement parts, "autonomous vehicle" fuel, and/or "autonomous vehicle" services.

20 Claims, 14 Drawing Sheets

Buyer machine Neural Network, training validation and execution.

(56) References Cited

U.S. PATENT DOCUMENTS

| | | | |
|---|---|---|---|
| 2002/0014952 A1* | 2/2002 | Terranova | G06Q 30/0236 |
| | | | 340/5.61 |
| 2013/0197830 A1* | 8/2013 | Dvorak | G06Q 10/20 |
| | | | 701/29.5 |
| 2016/0125460 A1* | 5/2016 | Zellner | G06Q 20/405 |
| | | | 705/26.7 |
| 2016/0253924 A1* | 9/2016 | Kwak | G07C 5/02 |
| | | | 701/123 |
| 2017/0148113 A1* | 5/2017 | Yasko | G06Q 40/04 |
| 2017/0287038 A1 | 10/2017 | Krasadakis | |
| 2018/0268506 A1* | 9/2018 | Wodetzki | G06N 5/046 |
| 2019/0220737 A1* | 7/2019 | Yao | G06N 3/04 |
| 2019/0266498 A1* | 8/2019 | Maluf | G06N 20/00 |
| 2019/0340503 A1* | 11/2019 | Cheng | G06F 16/3332 |
| 2020/0250720 A1* | 8/2020 | Schweitzer | G06Q 30/0643 |
| 2021/0082208 A1* | 3/2021 | Surace | H04W 4/40 |
| 2021/0334656 A1* | 10/2021 | Sjogren | G06N 3/048 |

FOREIGN PATENT DOCUMENTS

| | | | | |
|---|---|---|---|---|
| WO | WO03067432 A1 * | 8/2003 | | G06F 9/46 |
| WO | WO2005036319 A2 * | 4/2005 | | |
| WO | WO2012071543 A2 * | 5/2012 | | G06Q 30/00 |
| WO | WO2017053046 A1 * | 3/2017 | | G06Q 10/00 |
| WO | WO2018220541 A1 * | 12/2018 | | G06Q 20/38 |
| WO | WO2019002465 A1 * | 1/2019 | | G06N 3/04 |

OTHER PUBLICATIONS

Seitaridis, A., Rigas, E.S., Bassiliades, N., Ramchurn, S.D. (2016). Towards an Agent-Based Negotiation Scheme for Scheduling Electric Vehicles Charging. In: Rovatsos, M., Vouros, G., Julian, V. (eds) Multi-Agent Systems and Agreement Technologies. Eumas AT 2015 2015. (Year: 2015).*

D. Rengasamy, H. P. Morvan and G. P. Figueredo, "Deep Learning Approaches to Aircraft Maintenance, Repair and Overhaul: A Review," 2018 21st International Conference on Intelligent Transportation Systems (ITSC), Maui, HI, USA, 2018, pp. 150-156 (Year: 2018).*

Margaritis, Dimitris, "Learning Bayesian Network Model Structure from Data", Ph.D. Thesis, 2003, Carnegie, Mellon University.

Jinbig Wang, Xiaohong Wang, and Lizhi Wang, "Modeling of BN Lifetime Prediction of a System Based on Integrated Multi-Level Information", Sensors MDPI, 2017, 17, 2123.

* cited by examiner

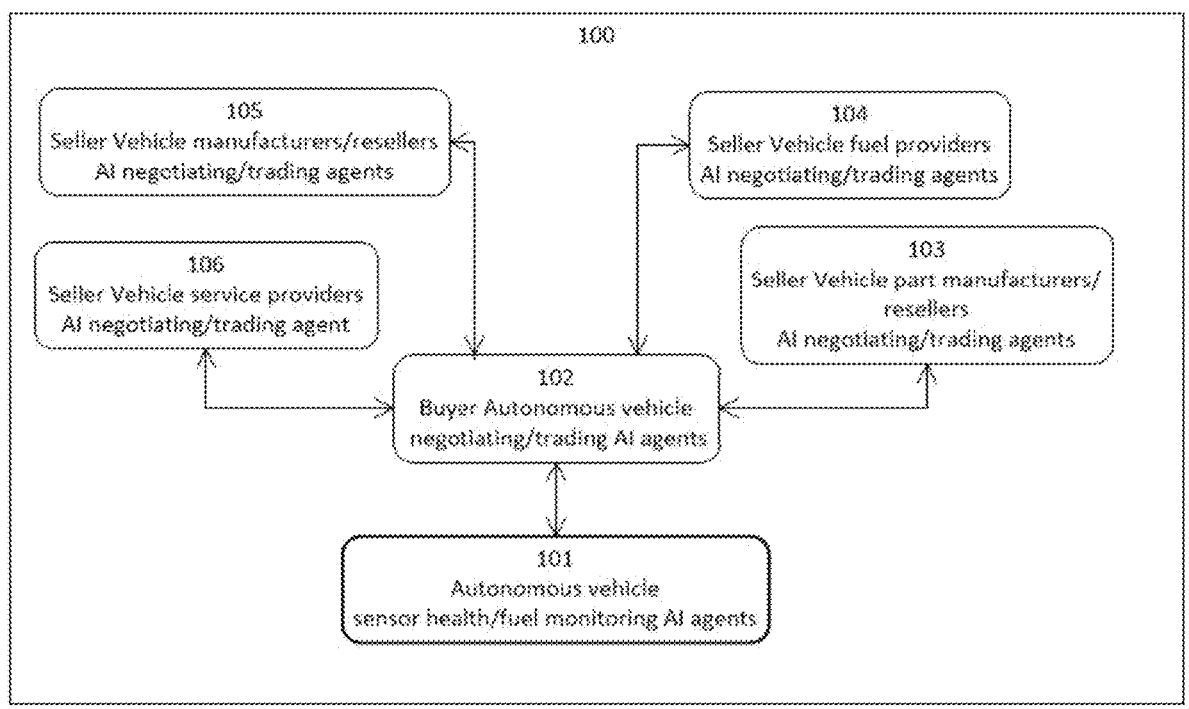
Fig. 1: Patent Artificial Intelligence Monitoring, Negotiating, and Trading Agents Architecture for Autonomous Vehicles

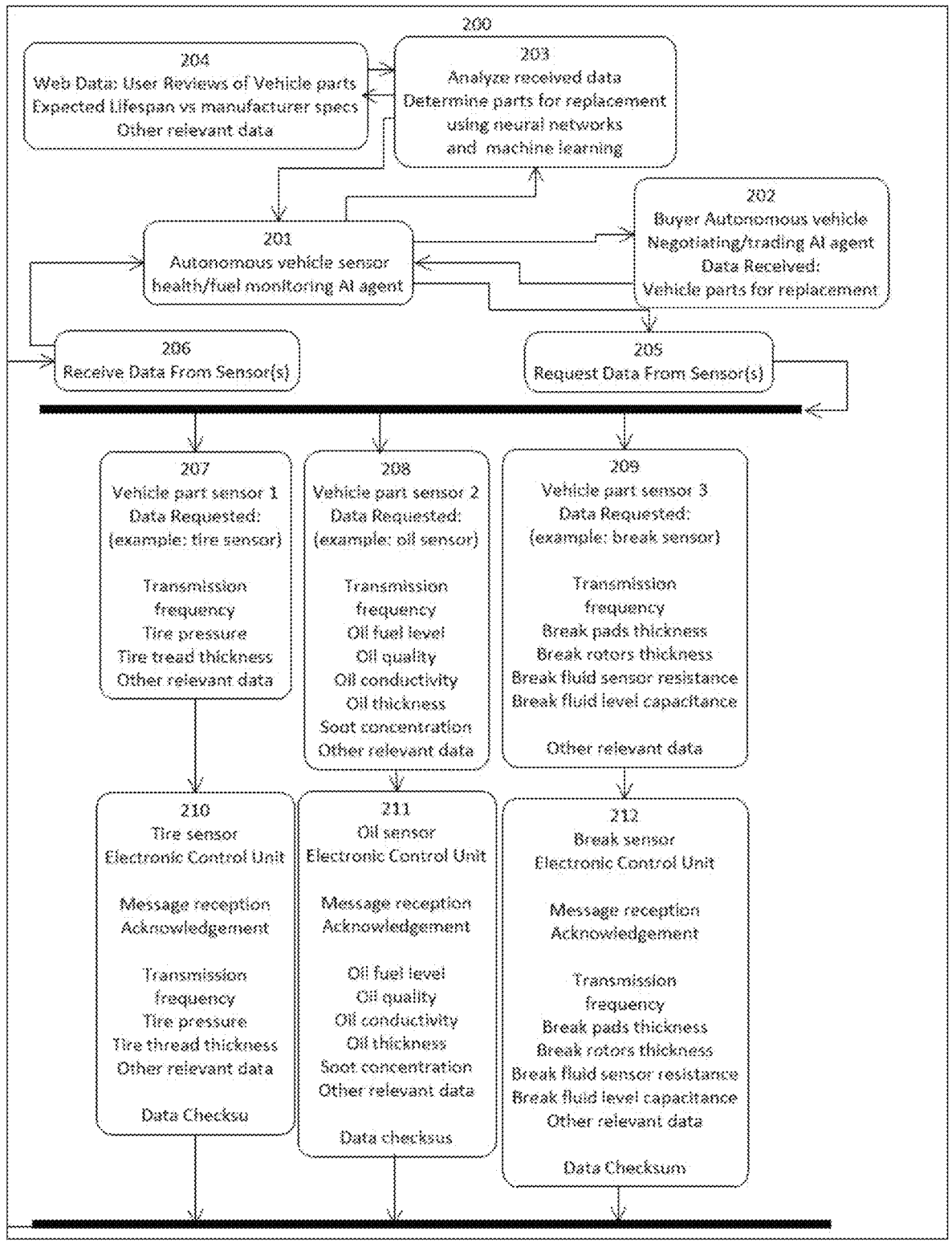
Fig. 2: Sensor Health/Fuel Monitoring AI Agent for Autonomous Vehicles

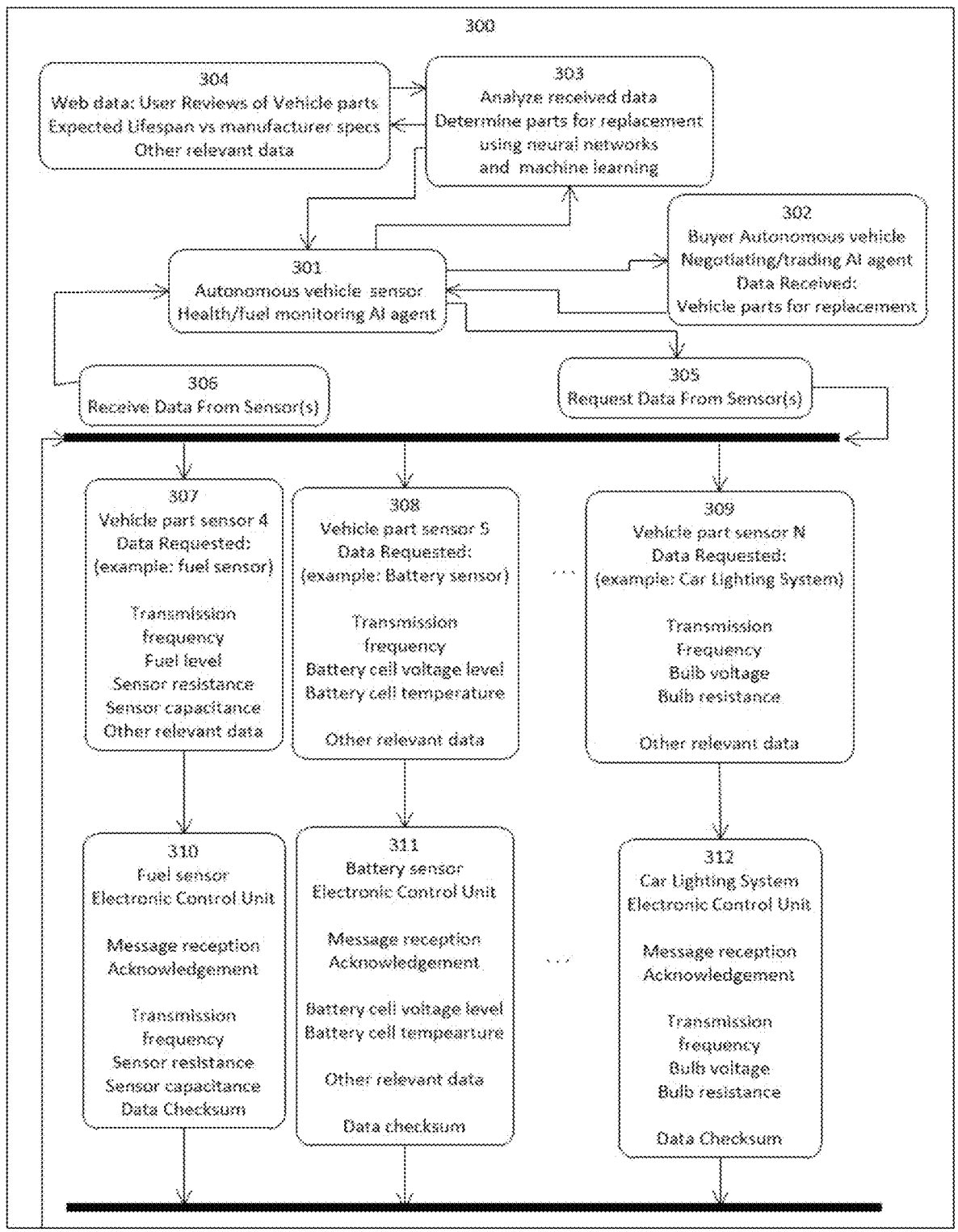
Fig. 3: Sensor Health/Fuel Monitoring AI Agent for Autonomous Vehicles continued

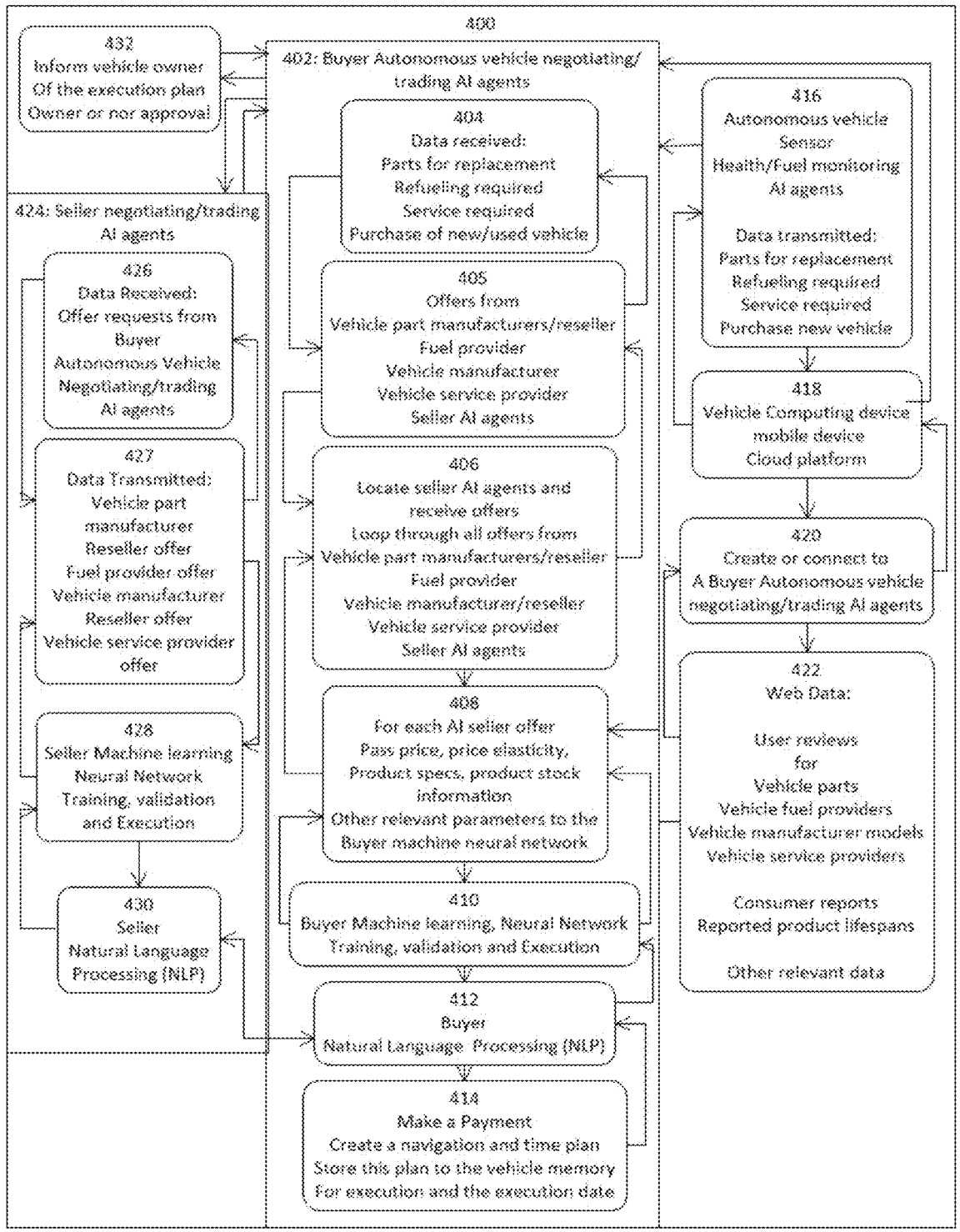
Fig. 4: Detailed functionality of a Buyer Autonomous Vehicle Negotiating/Trading agent(s).

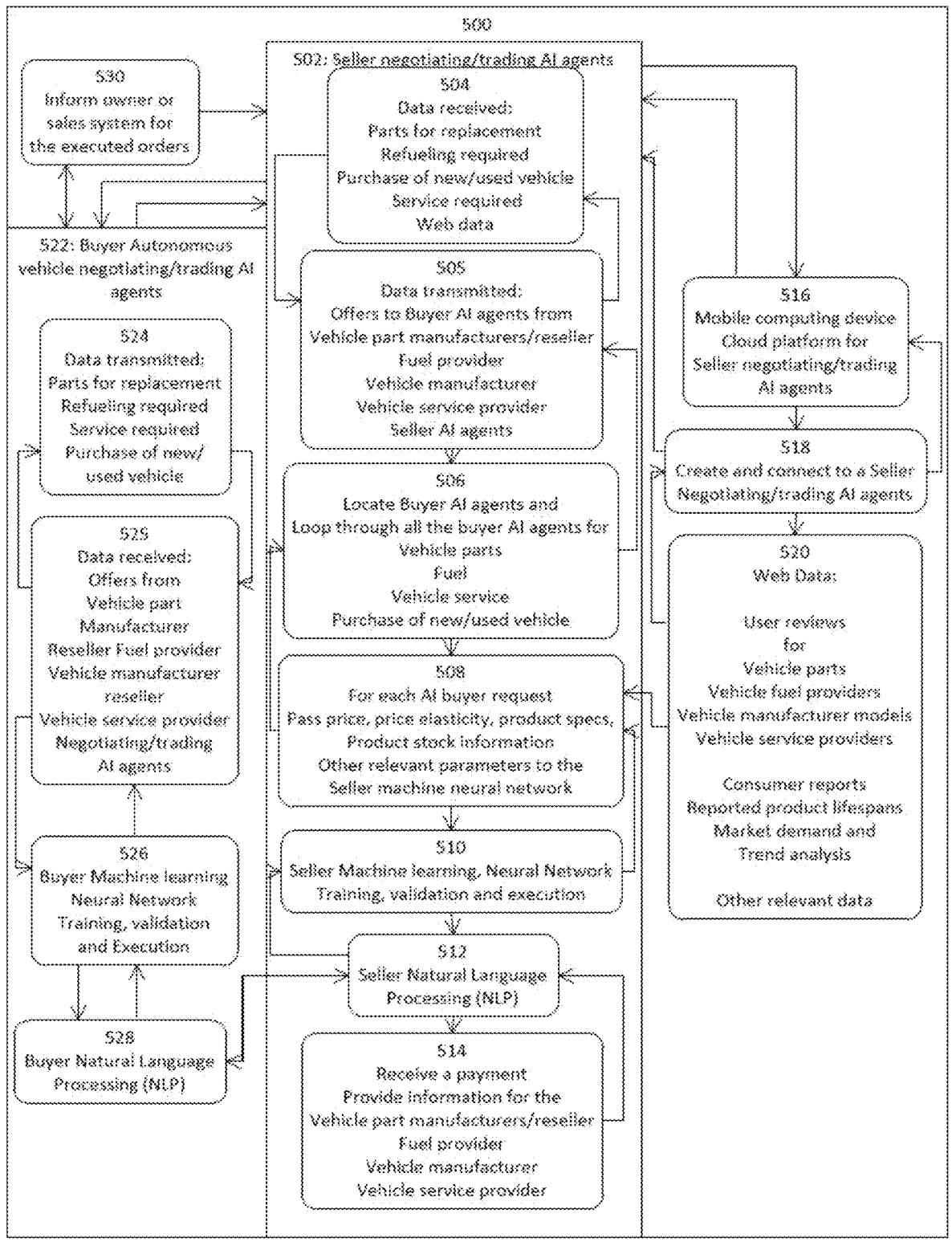
Fig. 5: Detailed functionality of a Seller Negotiating/Trading agent(s).

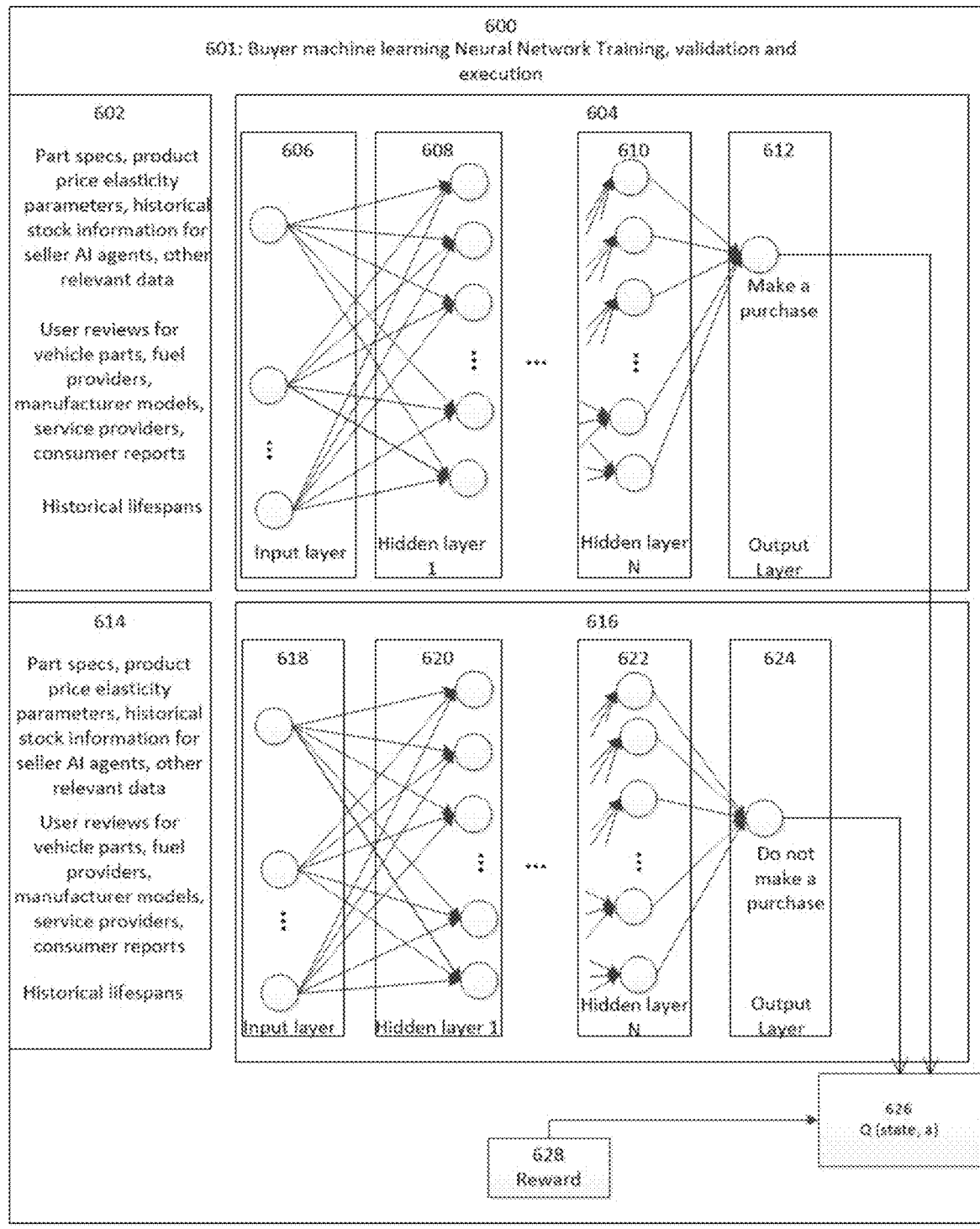
Fig. 6: Buyer machine Neural Network, training validation and execution.

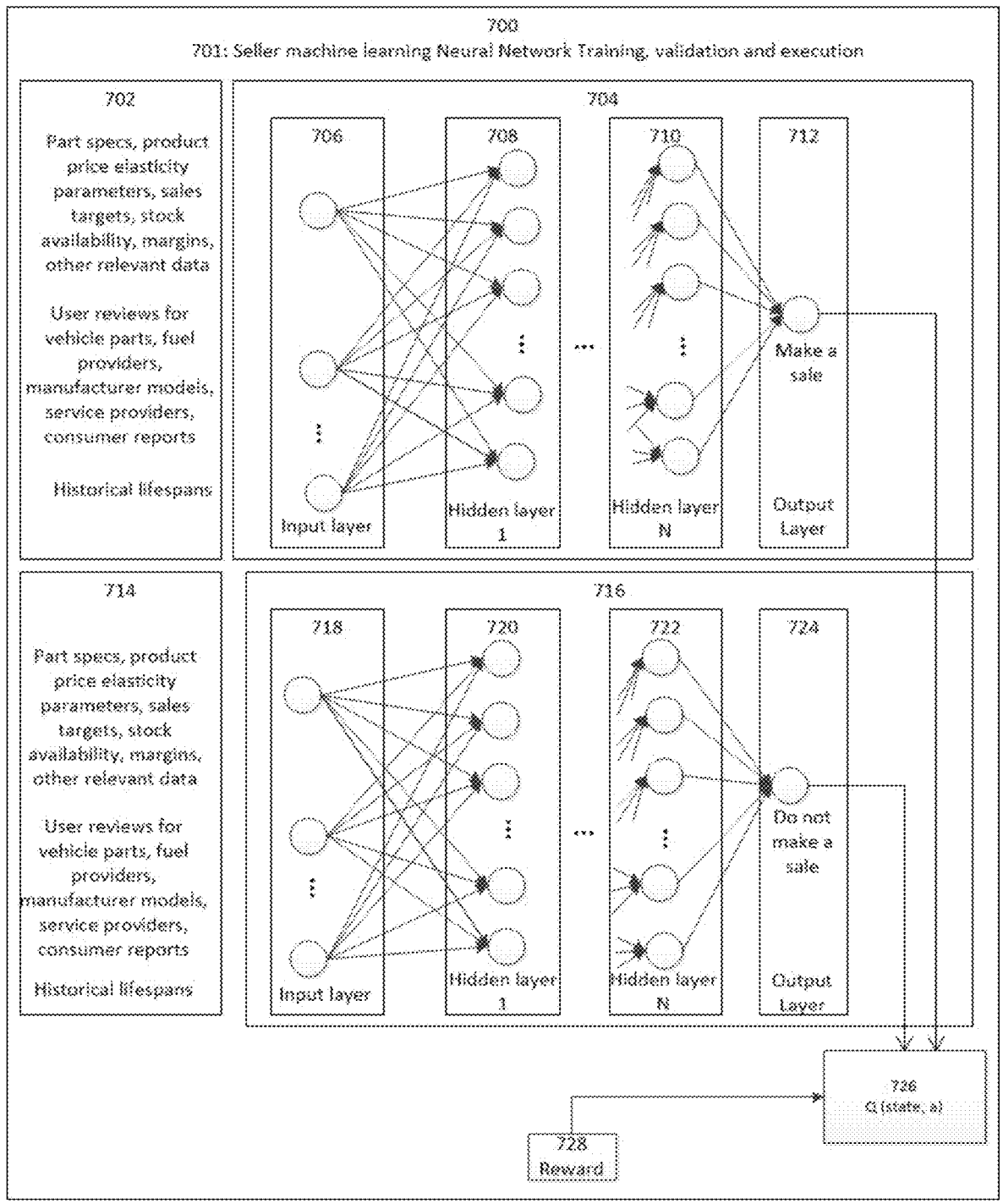
Fig. 7: Seller machine learning Neural Network Training, validation and execution

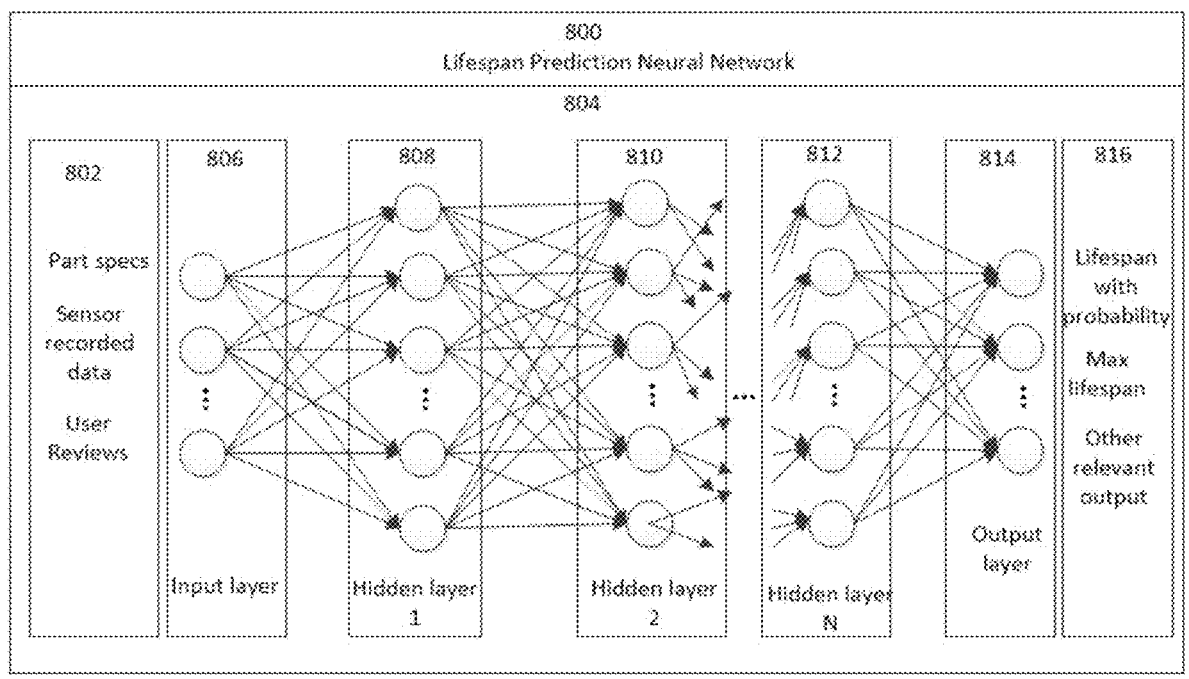
Fig. 8: Deep neural network for lifespan prediction of vehicle parts and the vehicle itself.

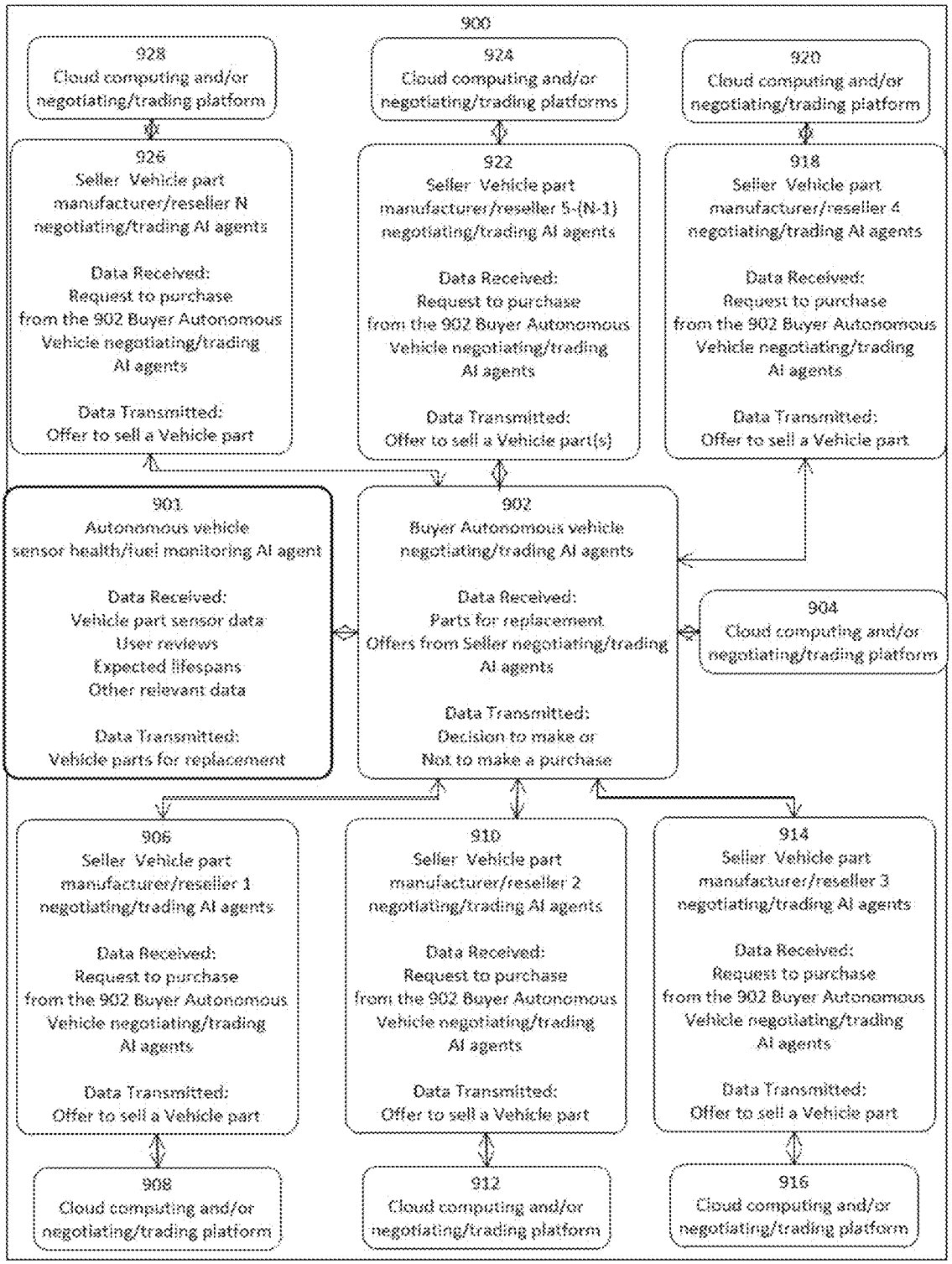
Fig. 9: Patent Artificial Intelligence Monitoring, Negotiating, and Trading Agents - Parts Manufacturer/resellers AI Agents for Autonomous Vehicles

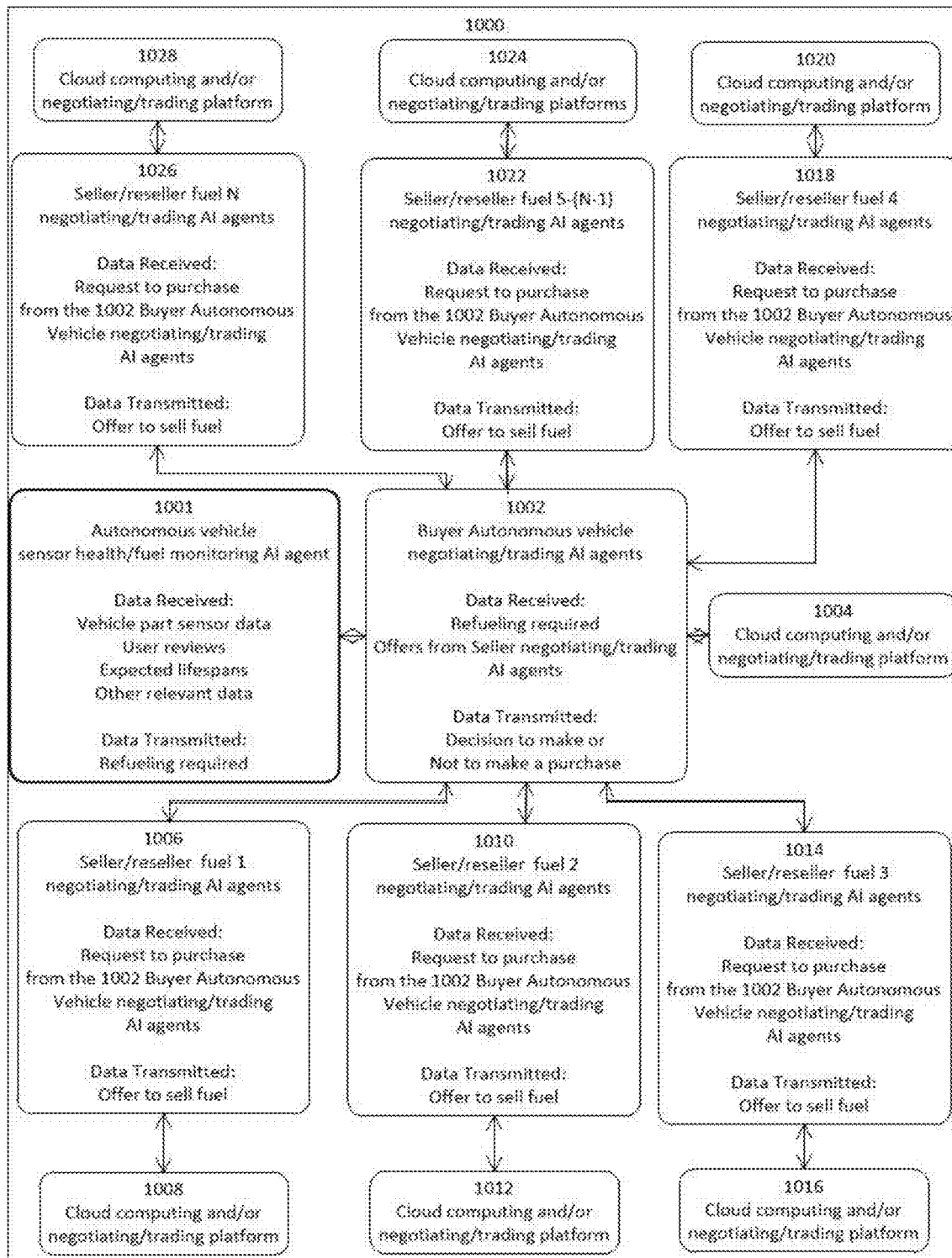
Fig. 10: Patent Artificial Intelligence Monitoring, Negotiating, and Trading Agents - Fuel Providers/Resellers AI Agents for Autonomous Vehicles

Fig. 11: Patent Artificial Intelligence Monitoring, Negotiating, and Trading Agents – Seller/resellers of new/used vehicles negotiating/trading AI agents

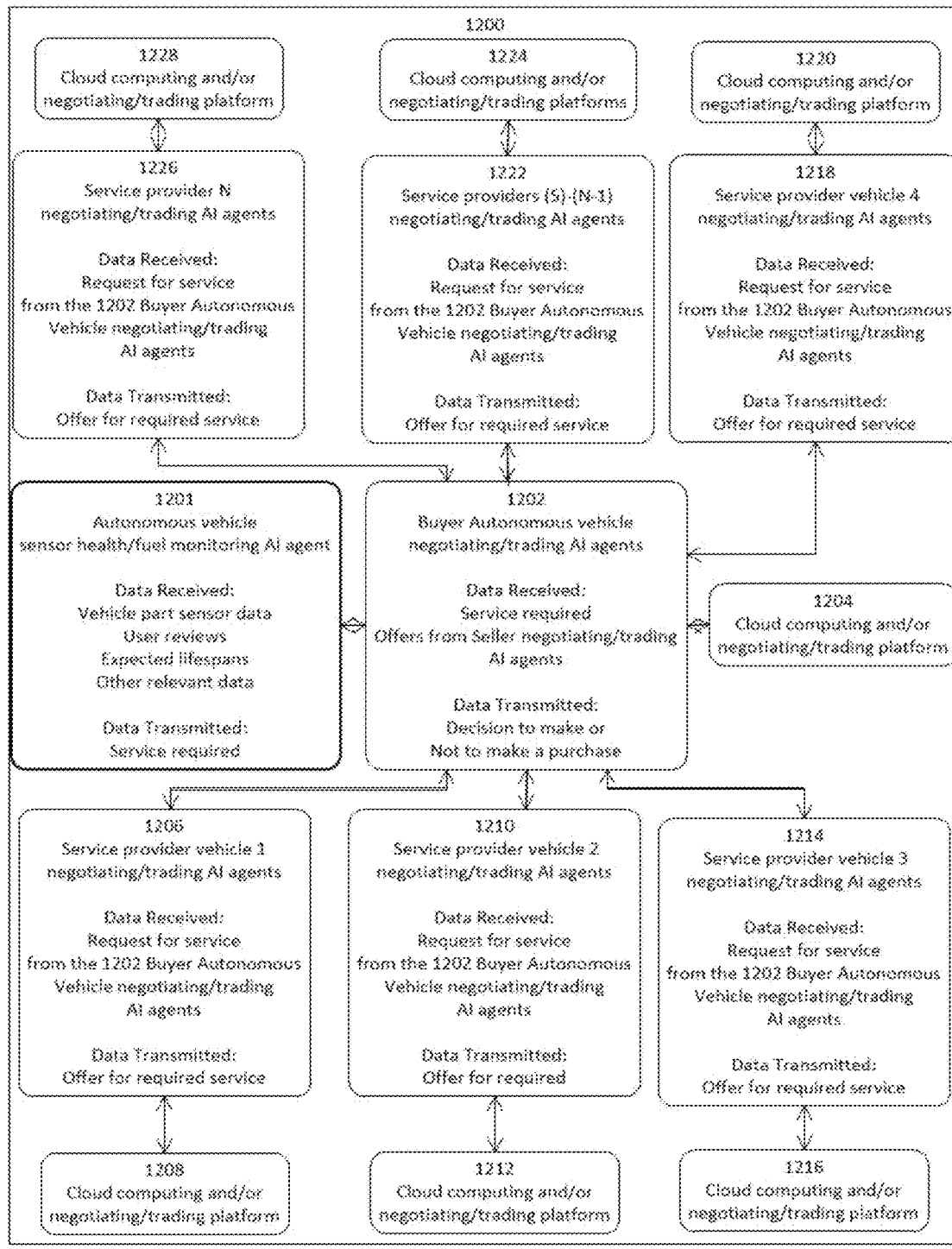
Fig. 12: Patent Artificial Intelligence Monitoring, Negotiating, and Trading Agents - Service Providers for Autonomous vehicle negotiating/trading AI agents

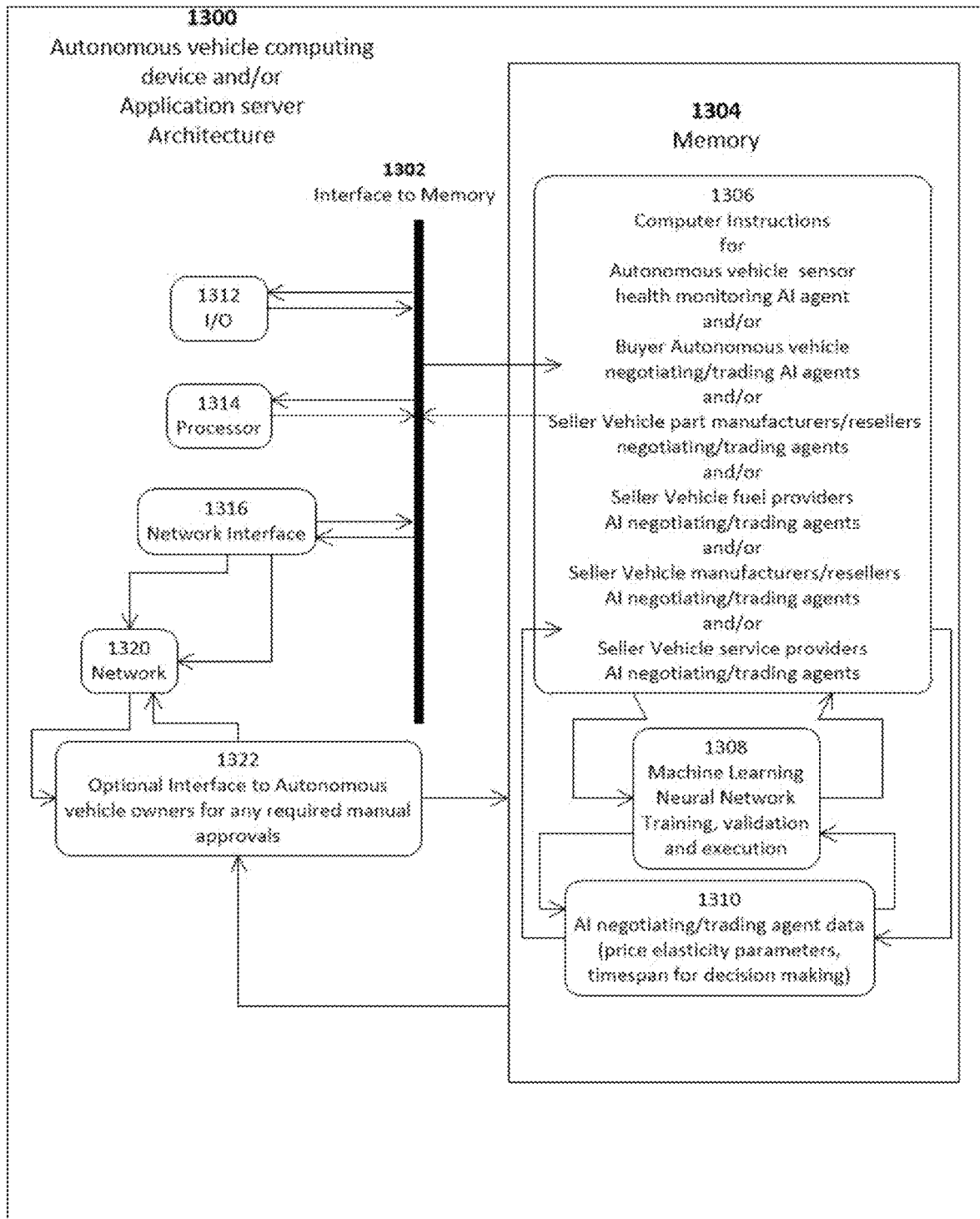
Fig. 13: Autonomous vehicle computing device and Application server architecture

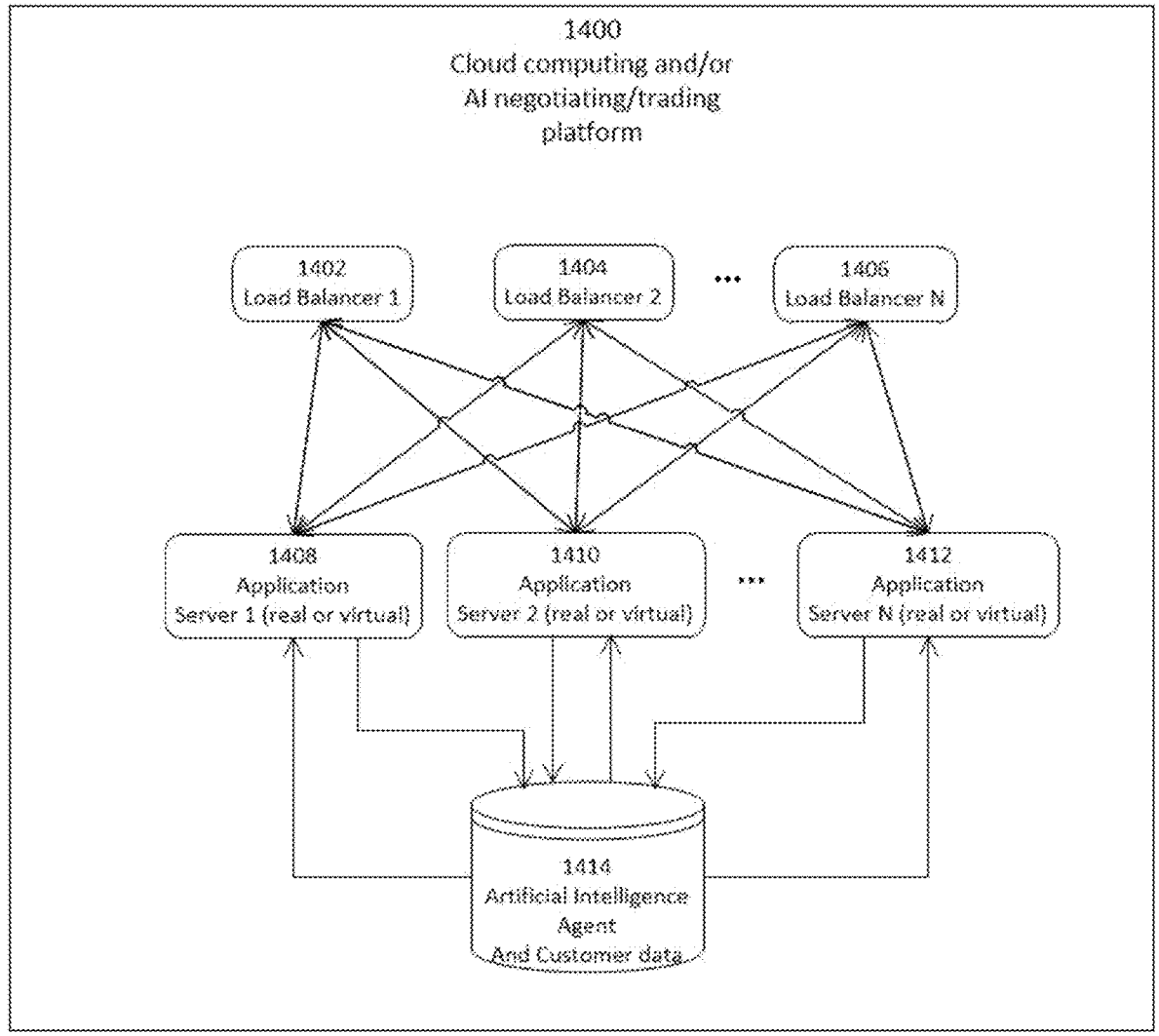
Fig. 14: Cloud computing and/or AI negotiating/trading platform

ARTIFICIAL INTELLIGENCE MONITORING, NEGOTIATING, AND TRADING AGENTS FOR AUTONOMOUS VEHICLES

BACKGROUND

One or more embodiments according to the present disclosure are in the technical field of Artificial Intelligence (AI) and AI agents, as applied to autonomous and/or driverless robotic vehicles operating on the ground (e.g., cars, trucks, busses, etc.), in the air (i.e., flying cars, drones, etc.), in, on, or under water (e.g., boat, ships, submarines, etc.) or underground (e.g. subways etc.). Within the context of Artificial Intelligence, an AI agent which is also referred to as "Intelligent Agent (IA)", "Abstract Intelligent Agent(s)" (AIA), or "Autonomous Intelligent Agent (AuIA)," is an autonomous entity which observes through sensors (software or hardware or a combination of both) and acts upon its environment through actuators (software or hardware or a combination of both) and directs its activities towards achieving specific goals and simultaneously learning from its environment to employ strategies which optimize the achievement of these goals. More particularly, one or more embodiments are in the field of AI e-commerce, negotiating/trading platforms and agents, AI trading platforms and AI agents using autonomous payments, specifically designed for autonomous ground, underground, or flying vehicles, ships, boats or submarines, vehicle parts, vehicle fuel, vehicle services, and new or used vehicle purchases.

One or more embodiments according to the present disclosure are in the area of AI negotiating and trading platforms for manually driven, autonomous, or semi-autonomous ground, underground, sea, or flying vehicles, vehicle parts, vehicle refueling, vehicle services, and purchases of new or used vehicles.

Present day vehicles, either ground, underground, sea or flying (e.g., drones), are operated manually or semi-autonomously, and there do not exist AI agents monitoring the health of vehicle parts and determining which parts need service and/or replacement, AI agents negotiating the prices of vehicle parts that need replacement and vehicle services, AI agents negotiating the prices of vehicle fuel, or AI agents negotiating the prices of new or used vehicles, AI agents negotiating the service charges, or AI agents to autonomously drive the vehicles to the appropriate location for servicing, parts replacing, purchasing new or used vehicles, or refueling.

Installed in the vehicles (e.g., cars, etc.) today, there exists a limited set of warning indicators, warning the vehicle operator (e.g., driver etc.), when vehicle parts break down (e.g., lights, battery, tire pressure, length of tire treads, or other vehicle parts), or when the car fluids (e.g., break, power steering fluids, etc.) reach a low point or need replacement. In all those cases and when the vehicle needs service, or is scheduled for service or when the vehicle parts need replacement, the driver or owner of the vehicle will try to manually find the best prices, and drive his vehicle to one of those places for servicing, or for fixing the faulty parts, or for buying a new or used vehicle.

BRIEF DESCRIPTION OF THE DRAWINGS

FIG. 1 is a drawing of the system architecture of an embodiment according to the present disclosure. The detailed charts/flow diagrams of each component in FIG. 1 and their interactions are described in FIGS. 2 through 18.

FIG. 2 is a drawing of a Sensor Health/Fuel Monitoring AI agent for Autonomous Vehicles according to an embodiment.

FIG. 3 is continuation of a drawing of a Sensor Health/Fuel Monitoring AI agent for Autonomous Vehicles according to an embodiment.

FIG. 4 is a drawing of a detailed functionality and data exchange for a buyer Autonomous Vehicle Negotiating Trading agent(s) according to an embodiment.

FIG. 5 is a drawing of a detailed functionality and data exchange for a seller Negotiating/Trading agent(s) according to an embodiment.

FIG. 6 is a drawing of a buyer machine learning Neural Network, training validation, and execution according to an embodiment.

FIG. 7 is a drawing of a seller machine learning Neural Network, training validation, and execution according to an embodiment.

FIG. 8 is a drawing of a deep neural network for lifespan prediction of vehicle parts and the vehicle itself according to an embodiment.

FIG. 9 is a drawing of seller Parts Manufacturer/reseller AI Agents for Autonomous Vehicles according to an embodiment.

FIG. 10 is a drawing of seller Fuel Providers AI Agents for Autonomous Vehicles according to an embodiment.

FIG. 11 is a drawing of seller new/used vehicle Manufacturers/Resellers AI Agents for Autonomous Vehicles according to an embodiment.

FIG. 12 is a drawing of seller vehicle service provider autonomous vehicle negotiating/trading AI agents according to an embodiment.

FIG. 13 is a drawing of the Autonomous vehicle computing device and Application server architecture according to an embodiment.

FIG. 14 is a drawing of the Cloud computing and/or AI negotiating/trading platform according to an embodiment.

DETAILED DESCRIPTION OF DISCLOSED EMBODIMENTS

The following detailed description provides many different embodiments, or examples, for implementing different features of the present disclosure. Specific examples of components or features, or specific configurations and arrangements are described below to provide a thorough understanding of the present disclosure. It will be apparent however, that one or more embodiments may be practiced without theses specific details. The embodiments provided in the detailed description are examples and specific configurations and are not intended to be limiting.

In the context of these embodiments, the terms "autonomous vehicles" or "vehicles" include cars, trucks, busses, motorcycles, bicycles, ships, boats, submarines, and the like whether operating on the ground, underground, in the air or in/on water. In the context of these embodiments, the terms "autonomous vehicles" or simply "vehicles" also include manually driven, autonomous, or semi-autonomous (e.g., vehicle having any type of simple to advanced cruise controls) ground, underground, sea, or flying vehicles, including and not limited to "drones" or other flying vehicles, or the like. In the context of these embodiments, the term "negotiation", "negotiate", or "negotiating" include auctions as well as subsequent trading on all vehicle parts, vehicle services, vehicle fuel, and trade of new or used vehicles, in accordance to the rules, offerings, and price discovering in negotiations, auctions, as well as in commodities and subsequent trading for investment and consumable assets. Furthermore, in the context of these embodiments, the term "fuel" includes any type of energy source (e.g., gasoline, electricity, hydrogen fuel cells, etc.).

The present disclosure of Artificial Intelligence Monitoring, Negotiating, and Trading Agents for Autonomous Vehicles, provides an open architecture platform with AI Agents monitoring the health of the "autonomous vehicle" parts, and fuel level, interfacing with the autonomous vehicle negotiating/trading agents for determining the best prices through negotiations, auctions or futures trading and for directing the vehicle autonomously, semi-autonomously, or manually to a specific location at a specific date for servicing, parts replacements, refueling, or purchasing a new or a used vehicle. The vehicle AI agents can also direct the other party's AI agents to provide all these services or deliver a new or used vehicle to the vehicle's owner location in accordance with one or more embodiments.

According to one or more embodiments, the platform for these embodiments includes 1) AI "health monitoring agent(s)" monitoring the health of the parts of the "autonomous vehicles" or "manually driven vehicles," 2) e-commerce AI "negotiating" agents, and 3) the back-end and the cloud computing infrastructure required for the AI agents to find the best possible prices through negotiations, auctions or subsequent trading for new or used "autonomous vehicles," "autonomous vehicle" replacement parts, "autonomous vehicle" fuel, and/or "autonomous Vehicle" service providers. As used herein, the term "agent" includes a hardware or hardware and software based component providing a particular functionality.

When the AI "health monitoring agent(s)" detect that certain parts of the "autonomous vehicles" need replacement or when the AI "health monitoring agent(s)" detect that "autonomous vehicles" need a specific service, the AI "health monitoring agent(s)" will transfer this information to the buyer AI "autonomous vehicle" "negotiating" AI agents. After successful negotiation of the buyer AI "autonomous vehicle" negotiating agents with the seller AI "negotiating" agents of the vehicle manufacturers, vehicle dealers, vehicle part providers, vehicle service providers, or the seller AI "negotiating agent(s)" of fuel dispensing stations, the buyer AI "autonomous vehicle" agents working on behalf of the "autonomous vehicle" will purchase through autonomous payments "vehicle" parts, "vehicle" fuel, "vehicle" services, or a new or used vehicle and will direct the "vehicle" autonomously or provide to the driver driving instructions to specific places at specific times for part replacements, for refueling, for "vehicle" servicing, for testing and/or purchasing of a new vehicle.

The health/fuel AI "autonomous vehicle" agents of the "autonomous vehicles" will be monitoring continuously the fuel level, the lifespan of all vehicle parts, as well as the lifespan of the entire "vehicle" through AI "health monitoring agent(s)." When the vehicle fuel becomes low, or when a vehicle part approaches the end of its lifespan, or when it is time to service the "autonomous vehicle," or to purchase a new or used "autonomous vehicle," the buyer "autonomous vehicle" AI agents will "negotiate" with the seller AI agents of vehicle manufacturers, vehicle part providers, service providers and fuel providers to receive the best price for a specific date at a specific location, either through negotiations, auctions or in accordance with futures and commodities trading price discovery. Price discovery is the point at which a specific buyer and specific seller decide to move from a establishing a general price to agreeing on a specific price for their transaction, based on the size of the transaction, location of the transaction, cost of the transaction, and other factors. It is a dynamic process, and in a way, it is the true mission of any market and any exchange.

The buyer "autonomous vehicle" AI agents exist (live) inside cloud computing platforms, inside any of the computing systems within the autonomous vehicles or connected computing platforms, inside trading platforms, inside fuel dispensing stations, or any other computing platforms, facilitating the price negotiations, of new or used autonomous vehicles, autonomous vehicle service providers, autonomous vehicle parts, and/or autonomous vehicle fuel.

Finally, the buyer autonomous vehicle AI agents interact with the autonomous vehicle navigation system to direct autonomously the autonomous vehicle or provide instructions to the autonomous vehicle operator to drive the vehicle at a specific date and time to a specific dispensing location to receive the vehicle part or vehicle fuel, service the autonomous vehicle, or purchase a new vehicle. The buyer "autonomous vehicle" AI agents can instruct the seller AI agents of the service providers to receive any of the above services at the vehicle owner's location in accordance with one or more embodiments.

Referring now to FIG. 1, an example of a system architecture 100 for autonomous vehicles includes an "Autonomous vehicle Sensor Health/Fuel monitoring AI agent(s)" 101 for monitoring the health, predicting the remaining lifespan of all vehicle parts, the vehicle itself, and fluids including fuel levels, and for determining which vehicle parts need replacement, what services are required, whether is time for refueling or for purchasing a new/used vehicle. This information is transferred to the "Byer autonomous vehicle negotiating/trading AI agent(s)" 102 which maintain two-way communications with the "Autonomous vehicle sensor Health/Fuel monitoring AI agent(s)" 101. The "Byer autonomous vehicle negotiating/trading AI agent(s)" 102 maintain two-way communications with the "Seller vehicle part manufacturers/resellers (dealers) AI negotiating/trading agent(s)" 103 to negotiate the prices for the vehicle parts which need service or replacement. The "Byer autonomous vehicle negotiating/trading AI agent(s)" 102 also maintain two-way communications with the "Seller vehicle fuel providers AI negotiating/trading agent(s)" 104 to negotiates the best prices for the vehicle fuel. The "Byer autonomous vehicle negotiating/trading AI agent(s)" 102 also maintain two-way communications with the "Seller vehicle manufacturers/resellers (dealers) AI negotiating/trading agent(s)" 105 to negotiate the prices for purchasing a new or a used vehicle. The "Byer autonomous vehicle negotiating/trading AI agent(s)" 102 also maintains two-way communications with "Seller vehicle service providers AI negotiating/trading agent(s)" 106 to negotiate the prices for the required vehicle services. FIG. 1 provides an open architecture platform with AI agents 101 monitoring the health and lifespan of the autonomous vehicles, autonomous vehicle parts, and fuel levels, and providing information to the Buyer AI agents 102 for replacing vehicle parts, for purchasing vehicle fuel, for purchasing a new or used vehicle, or for purchasing a vehicle service. In turn, the Buyer AI agents 102 negotiate with one or more of the Seller AI agents 103, 104, 105, and 106 to determine the best prices through negotiations, auctions, or futures trading and to direct the vehicle manually, semi-autonomously, or autonomously to a specific location at a specific date for vehicle part(s) replacement, for purchasing fuel, for purchasing a new or used vehicle, or for vehicle servicing. The detailed charts/flow diagrams of the components in FIG. 1 and how these components operate, function, and communicate, and how the specific configuration achieves the objective of the present disclosure is described in FIGS. 2 through 18.

Referring now to FIGS. 2-3, an example of the functionality of the sensor health/fuel Monitoring AI Agent(s) 200/300, includes an "Autonomous vehicle sensor health/fuel Monitoring AI agent" 201/301, an embodiment of the AI agent, shown as 101 in FIG. 1 and a "Buyer Autonomous vehicle negotiating/trading AI agent(s)" 202/302, an embodiment of the AI agent, shown as 102 in FIG. 1. The "Autonomous vehicle sensor Health/fuel monitoring AI agent" 201/301 requests data from each of the "Vehicle part sensors" 207-209/307-309, checks the validity of the received data, and retransmits the received data to the "Analyze received data, determine part for replacement using neural networks and machine learning" 203/303 analysis module for analysis and to determine which vehicle parts need replacement, whether fuel or service is required, or it is time to purchase a new/used vehicle. The analysis module 203/303 maintains two way communications with various web sites "Web Data: User Reviews of Vehicle parts, Expected Life span vs Manufacturer specs, other relevant data" 204/304 and extracts from the web user reviews for the vehicle parts, user reported lifespans, as well as the manufacturer specs and expected lifespans. These data together with the data retrieved from the vehicle sensors 207-209/307-309 are employed as inputs by the analysis module 203/303 to train one or more neural networks to predict the remaining lifespan of each of the vehicle parts. Once these neural networks are trained, the analysis module 203/303 will be able to predict the remaining lifespan for each vehicle part, and consequently what vehicle parts need replacement, what services are required, whether refueling is required or whether it is time to purchase and new/used vehicle, based on the retrieved web data 204/304 as well as the reported status data from each of the vehicle part sensors 207-209/307-309. In one or more embodiments, when the analysis module 203/303 determines that a vehicle part approaches the end of its lifespan or one or more fuel levels get low, it will send this information to the "Autonomous vehicle sensor health/fuel monitoring AI agent" 201/301. The "Autonomous vehicle sensor health/fuel monitoring AI agent" 201/301 will send a request to the "Buyer autonomous vehicle negotiating/trading agent" 202/302 to start and complete the process for buying the vehicle part that needs replacement, for refueling, for servicing, or for buying a new/used vehicle within a specified period of time, determined by the remaining lifespan of the vehicle part or fuel levels. "The Buyer Autonomous vehicle negotiating/trading AI agent(s)" 202/302 will send back a message to the "Autonomous vehicle sensor health/fuel monitoring AI agent" 201/301 to acknowledge the request and the "Buyer Autonomous vehicle negotiating/trading AI agent(s)" 202/302 will start the process of purchasing the vehicle part(s), refueling, purchasing a new/used vehicle, or servicing the vehicle. The "Buyer Autonomous vehicle negotiating/trading AI agent(s)" 202/302, an embodiment of the AI agent, shown as 102 din FIG. 1, maintains two ways communications with the "Autonomous vehicle sensor health/fuel monitoring AI agent(s)" 201/301. The "Request Data from Sensor(s)" 205/305 module receives the data requests from the "Autonomous vehicle sensor health/fuel monitoring AI agent" 201/301 and routes those data requests to the corresponding "Vehicle part sensors" 207/209-307/309. The data transmitted back from the "Vehicle part sensors" 207/209-307/309 are routed to the "Receive Data from Sensors" 206/306 module which checks the validity and integrity of the received data and sends the sensor data to the "Autonomous vehicle sensor health/fuel monitoring AI agent" 201/301. In one or more embodiments, the "Requests Data from Sensor(s)" 205 module sends messages to the "Vehicle part sensors" 207-209/307-309 either synchronously or asynchronously, and each of these "Vehicle part sensors" 207-209/307-309 starts the process of retrieving the corresponding data. Referring to FIG. 2, when the "Vehicle part sensor 1 (example: tire sensor)" 207 module receives a request from the "Requests Data from Sensor(s)" 205 module to retrieve tire sensor data, it will send a request to the "Tire Sensor Electronic Control Unit" 210 to retrieve the tire pressure, tire tread thickness, and other relevant tire sensor data. The "Tire Sensor Electronic Control Unit" 210 acknowledges the data request from the "Vehicle part sensor 1 (example: tire sensor)" 207, retrieves the most recent tire sensor data from its memory and sends the data back to the "Vehicle part sensor 1 (example: tire sensor)" 207 at the requested transmission frequency. The "Vehicle part sensor 1 (example: tire sensor)" 207 sends the data to the "Receive data from Sensor(s)" 206 module for rerouting the data to the "Autonomous vehicle sensor "Autonomous vehicle sensor health/fuel monitoring AI agent" 201. In one or more embodiments the "Tire Sensor Electronic Control Unit" 210 retrieves the tire sensor data from the tire sensor at a predefined frequency which is set by default or through a request by the "Vehicle part sensor 1 (example: tire sensor)" 207 module. Furthermore, when the "Vehicle part sensor 2 (example: oil sensor)" 208 module receives a request from "Requests Data from Sensor(s)" 205 module to retrieve data, it will send a request to the "Oil Sensor Electronic Control Unit" 211 to retrieve the oil fuel level, oil quality, oil conductivity, oil thickness, soot concentration and other relevant data. The "Oil Sensor Electronic Control Unit" 211 acknowledges the data request from the "Vehicle part sensor 2 (example: oil sensor)" 208, retrieves the most recent oil sensor data from its memory and sends the data back to the "Vehicle part sensor 2 (example: oil sensor)" 208 at the requested transmission frequency. The "Vehicle part sensor 2 (example: oil sensor)" 208 sends the data to the "Receive data from Sensor(s)" 206 module for rerouting the oil sensor data to the "Autonomous vehicle sensor "Autonomous vehicle sensor health/fuel monitoring AI agent" 201. In one or more embodiments the "Oil Sensor Electronic Control Unit" 210 retrieves the oil sensor data from the oil sensor at a predefined frequency which is set by default or through a request by the "Vehicle part sensor 2 (example: oil sensor)" 208. When the "Vehicle part sensor 3 (example: break sensor)" 209 module receives a request from "Requests Data from Sensor(s)" 205 module to retrieve data, it will send a request to the "Break Sensor Electronic Control Unit" 212 to retrieve the break pad thickness, break rotor thickness, break fluid sensor resistance, break fluid level capacitance, and other relevant break data. The "Break Sensor Electronic Control Unit" 212 acknowledges the data request from the "Vehicle part sensor 3 (example: break sensor)" 209, retrieves the most recent break sensor data from its memory and sends the data back to the "Vehicle part sensor 3 (example: break sensor)" 209 at the requested transmission frequency. The "Vehicle part sensor 3 (example: break sensor)" 209 sends the data to the "Receive data from Sensor(s)" 206 module for rerouting the break sensor data to the "Autonomous vehicle sensor "Autonomous vehicle sensor health/fuel monitoring AI agent" 201 for further processing. In one or more embodiments the "Break Sensor Electronic Control Unit" 212 retrieves the break sensor data from the break sensor at a predefined frequency which is set by default or through a request by the "Vehicle part sensor 3 (example: break sensor)" 209 module. Referring to FIG. 3, when the "Vehicle part sensor 4 (example: fuel sensor)" 307 module receives a request from "Requests Data from Sensor(s)" 305 module to retrieve fuel sensor data, it will send a request to the "Fuel sensor Electronic Control Unit" 310 to retrieve the fuel level, fuel sensor resistance, fuel sensor capacitance, and other fuel relevant data. The "Fuel Sensor Electronic Control Unit" 310 acknowledges the data request from the "Vehicle part sensor 4 (example: fuel sensor)" 307, retrieves the most recent fuel sensor data from its memory and sends the data back to the "Vehicle part sensor 4 (example: fuel sensor)" 307 at the requested transmission frequency. The "Vehicle part sensor 4 (example: fuel sensor)" 307 sends the data to the "Receive data from Sensor(s)" 306 module for rerouting the fuel sensor data to the "Autonomous vehicle sensor "Autonomous vehicle sensor health/fuel monitoring AI agent" 301 for further processing. In one or more embodiments the "Fuel Sensor Electronic Control Unit" 310 retrieves the fuel sensor data from the fuel sensor at a predefined frequency which is set by default or through a request by the "Vehicle part sensor 4 (example: fuel sensor)" 307 module. When the "Vehicle part sensor 5 (example: Battery sensor)" 308 module receives a request from "Requests Data from Sensor(s)" 305 module to retrieve battery sensor data, it will send a request to the "Battery sensor Electronic Control Unit" 311 to retrieve the battery cell voltage data, battery cell temperature, and other battery relevant data. The "Battery sensor Electronic Control Unit" 311 acknowledges the data request from the "Vehicle part sensor 5 (example: Battery sensor)" 308, retrieves the most recent battery sensor data from its memory and sends the data back to the "Vehicle part sensor 5 (example: battery sensor)" 308 at the requested transmission frequency. The "Vehicle part sensor 5 (example: Battery sensor)" 308 sends the data to the "Receive data from Sensor(s)" 306 module for rerouting the Battery sensor data to the "Autonomous vehicle sensor "Autonomous vehicle sensor health/fuel monitoring AI agent" 301 for further processing. In one or more embodiments the "Battery Sensor Electronic Control Unit" 310 retrieves the battery sensor data from the battery sensor at a predefined frequency which is set by default or through a request by the "Vehicle part sensor 5 (example: battery sensor)" 308 module. The same logical process is involved for all vehicle parts up to and including the final sensor N (e.g., Car lighting system). When the "Vehicle part sensor N (example: Car lighting system)" 309 module receives a request from "Requests Data from Sensor(s)" 305 module to retrieve car lighting system data, it will send a request to the "Car lighting system Electronic Control Unit" 312 to retrieve the car lighting bulb voltage, car lighting bulb resistance for all vehicle bulbs and other bulb relevant data. The "Car lighting system Electronic Control Unit" 312 acknowledges the data request from the "Vehicle part sensor N (example: Car lighting system)" 309, retrieves the most recent car lighting system data from its memory and sends the data back to the "Vehicle part sensor N (example: Car lighting system)" 309 at the requested transmission frequency. The "Vehicle part sensor N (example: Car lighting system)" 309 sends the data to the "Receive data from Sensor(s)" 306 module for rerouting the car lighting system data to the "Autonomous vehicle sensor "Autonomous vehicle sensor health/fuel monitoring AI agent" 301 for further processing. In one or more embodiments the "Car lighting system Electronic Control Unit" 312 retrieves the car lighting system data from the car lighting system data at a predefined frequency which is set by default or through a request by the "Vehicle part sensor N (example: Car lighting system)" 309 module. In reference to FIG. 3, the three dots " . . . " represents any other vehicle part which when receives a request to retrieve data from the 205/305 "Request data from sensor(s)", follows the same processes as those discussed for the vehicle parts 207/207 and 307/309 respectively.

An Electronic Control Unit (Unit) is an electronic device that is fed several inputs from one or several of the vehicle's sensors, stores these inputs into its own memory and is also able to take over the control processes of automated functions in vehicles (e.g., turning on lights automatically, based on light sensor inputs). Access to car sensor information, either through the ECUs or directly from the sensors as well as transmission of control messages is achieved either through a Control Area Network (CAN) bus interface or wirelessly. The CAN bus is a communication system, specifically designed for vehicle intercommunication consisting of a Media Access Control (MAC) module and a Physical Layer Signaling Module (PLS) as defined by the ISO standard 11898. In one or more embodiments the sensor data can be accessed through the CAN bus interface or wirelessly either through the ECUs or directly from the car sensors.

In at least some embodiments, the "Autonomous vehicle sensor health/fuel monitoring AI agent(s)" 201/301 and the "Byer Autonomous vehicle negotiating/trading AI agent(s)" 202/302 are able to establish one or two-way communications with each other on an as-needed, on-demand, ad hoc, or periodic basis, in place of maintaining two-way communications. In at least some embodiments, one or more of "Autonomous vehicle sensor health/fuel monitoring AI agent(s) 201/301 and "Buyer Autonomous vehicle negotiating/trading AI agent(s)" 202/302 communicate with one of more of the foregoing communication standards. In at least some embodiments, the "Autonomous vehicle sensor health/fuel monitoring AI agent(s)" 201/301 are able to establish one or two-way communications with one or more of the vehicle sensors 207-209/307-309 on an as-needed, on-demand, ad hoc, or periodic basis, in place of maintaining two-way communications. In at least some embodiments, the "Autonomous vehicle sensor health/fuel monitoring AI agent(s)" 201/301 may communicate with one or more of "Vehicle part sensor(s)" 207-209/307-309 either directly or through the "Request data from sensor(s)" 205/305 and "Receive data from sensor(s)" 206/306, using one of more of the foregoing list of communication standards. These communication standards, include and are not limited to short range Bluetooth communication standards (i.e., IEEE 802.15.1), WiFi (i.e., 802.11 a/b/g/n/ac), 3G (up to 2 Mbs), 4G (up to 100 Mbps), 5G (up to 1 Gbps), or other future emerging wireless and/or in-vehicle communication networks.

In at least one or more embodiments the "Autonomous vehicle sensor health/fuel monitoring AI agent(s)" 201/301 may reside inside vehicle's computational platform, inside a mobile device or inside a cloud platform. In at least one or more embodiments the "Buyer Autonomous vehicle negotiating/trading AI agent (s)" 202/302 may reside inside vehicle's computational platform, inside a mobile device or inside a cloud platform. In at least one or more embodiments the "Analyze received data, determine parts for replacement, using neural networks and machine learning" 203/303 may reside inside vehicle's computational platform, inside a mobile device or inside a cloud platform. In at least one or more embodiments the "Request data from sensor(s)" 205/305 and or "Receive data from sensor(s)" 206/306 may reside inside vehicle's computational platform, inside a mobile device or inside a cloud platform. In at least one or more embodiments the "Vehicle part sensor(s)" 207-209/ 307-309 may reside inside vehicle's computational platform, inside a mobile device or inside a cloud platform.

Referring now to FIG. 4, an embodiment of the functionality 400 is shown of a "Buyer Autonomous Vehicle Negotiating/Trading AI agent(s)" 402 and its interactions with the "Autonomous vehicle sensor Health/Fuel monitoring AI Agent(s)" 416 as well as the "Seller negotiating/trading AI agent(s)" 424. The "Buyer Autonomous vehicle negotiating/trading AI agents" 402 is an embodiment of the "Buyer Autonomous Vehicle negotiating trading AI agents(s)" 102, 202, and 302, shown in FIGS. 1, 2, and 3 respectively. The "Autonomous vehicle Sensor Health/Fuel monitoring AI agent(s)" 416 is an embodiment of the "Autonomous vehicle sensor health/fuel monitoring AI agent(s)" 101, 201, and 301, shown in FIGS. 1, 2, and 3 respectively. The "Autonomous vehicle Sensor Health/Fuel monitoring AI agent(s)" 416 are monitoring the health and predict the remaining lifespan of all vehicle parts, fluids including fuel levels, and the vehicle itself, and transmit such data as parts that need replacement, refueling is required, service is required, or purchase of a new/used vehicle, to the "Vehicle computing device/mobile device/cloud platform" 418. The "Vehicle Computing device device/mobile device/cloud platform" 418 creates a new or connects to an existing "Buyer autonomous vehicle negotiating/trading AI agent(s)" 402 through the "Create or connect to a Buyer Autonomous vehicle negotiating/trading AI agent(s)" 420 module. In one or more embodiments the "Vehicle computing device mobile device cloud platform" 418 resides either inside the vehicle's computing device, or inside a mobile device, or inside a cloud platform. The functionality of the "Buyer Autonomous Vehicle Negotiating/Trading AI agent(s)" 400 additionally includes "Seller negotiating/trading AI agent(s)" 424 which is an embodiment for either the "Seller vehicle part manufactures/resellers AI negotiating/trading agent(s)" 103, the "Seller vehicle fuel providers AI negotiating/trading agent(s)" 104, the "Seller vehicle manufacturers/resellers AI negotiating/trading agent(s)" 105, or the "Seller Vehicle service providers AI negotiating/trading agent(s)" 106, shown in FIG. 1. The "Buyer Autonomous vehicle negotiating/trading AI agent(s)" 402 maintains two-way communications with the "Autonomous vehicle Sensor health/fuel monitoring AI agent(s)" 416 as well as the "Vehicle computing device/mobile device/cloud platform" 420 module. The "Seller negotiating/trading AI agent(s)" 424 receive "Offer requests from the Buyer Autonomous Vehicle negotiating/trading AI agents" 426. The corresponding "Seller negotiating/trading AI agent(s)" 424 provide "Vehicle part manufacturer/reseller offers, or fuel provider offers, or vehicle manufacturer/reseller offers, or vehicle service provider offers" 427 to the "Buyer autonomous vehicle negotiating/trading agents" 402. The "Vehicle part manufacturer/reseller offers, or fuel provider offers, or vehicle manufacturer/reseller offers, or vehicle service provider offers" 427 are provided by the "Seller Machine learning Neural network Training validation and execution" 428. The "Seller Natural Language Processing (NLP)" 430 neural network and the "Buyer Natural Language Processing (NLP)" neural network 412 provide the means for the direct negotiations between the "Seller Machine learning Neural Network Training, validation, and execution" 428 and the "Buyer Machine learning Neural Network Training, validation and Execution" 410.

In one or more embodiments of the functionality 400, the "Buyer autonomous vehicle negotiating/trading AI agent(s)" 402 receives data including "Parts for replacement, refueling required, service required, and purchase of a new/used vehicle" 404 from the "Autonomous vehicle Sensor health/fuel monitoring AI agent(s)" 416 as well as "Offers from Vehicle part manufacturer/reseller, fuel providers, vehicle manufacturer/resellers, vehicle service providers Seller AI agents" 405 from the corresponding "Seller negotiating/trading AI agent(s)" 424 through the "Seller Machine Learning Neural Network, Training validation and execution" 428. The "Buyer autonomous vehicle negotiating/trading AI agents" 402 also communicates with the internet and/or social media network sites to receive such data as "User Reviews for Vehicle parts, Vehicle fuel providers, Vehicle manufacturer models, vehicle Service providers, consumer reports, reported and estimated product lifespans, and other relevant data." 422. The "Buyer autonomous vehicle negotiating/trading AI agent(s)" 402 receives offers "Offers from Vehicle part manufacturer/reseller, fuel provider, vehicle manufacturer/reseller, vehicle service provider AI agents" 405 and subsequently locates and loops through "Locate seller negotiating/trading AI agents, receive offers, Loop through all offers from vehicle part manufacturers/resellers, fuel providers, vehicle manufacturers/resellers, vehicle service providers" 406. For each offer from "Offers from Vehicle part manufacturer/reseller, fuel providers, vehicle manufacturer/resellers, vehicle service providers Seller AI agents" 405, pass information "pass price, price elasticity, product specs, product stock information, other relevant parameters to the Buyer machine neural network" 408 as well as "User Reviews for Vehicle parts, Vehicle fuel providers, Vehicle manufacturer models, vehicle Service providers, consumer reports, reported and estimated product lifespans, and other relevant data." 422 to the "Buyer Machine learning neural network, training validation and execution" 410 to make a purchase decision or to wait for the next offer. When the "Buyer Machine learning neural network, training validation and execution" 410 makes a decision to purchase, will "provide payment, create a navigation and time plan, store this plan into the vehicle memory for execution as well as the execution date" 414. The decision to select the best offer is made in by the "Buyer machine learning neural network raining, validation, and execution" 410. A "Buyer Natural Language Processing (NLP)" neural network 412 and "Seller Natural Language Processing (NLP)" neural network" 430 allow for natural language negotiations between the "Seller machine neural network, training validation and execution" 428 and the "Buyer Machine Learning neural network training, validation, and execution" 410. The use of Natural Language Processing (NLP) provides the capability for "Buyer Machine learning, Neural network, training, validation, and execution" 410 to negotiate directly with the "Seller Machine learning Neural Network, Training, Validation, and Execution" 428. The direct negotiation between the "Buyer Machine learning Neural Network" 410 and the "Seller Machine learning Neural Network" 428 provides the means for a price discovery which is optimum for both the "Buyer Autonomous Vehicle negotiating/trading AI agents" 402 as well as the "Seller negotiating/trading AI agents" 424. In one or more embodiments an owner intervention may be required for the "Buyer Autonomous vehicle negotiating/trading AI agents" 402 which is provided through the "Inform vehicle owner of the execution plan owner or not approval" 432.

Referring now to FIG. 5, an embodiment is shown of the functionality 500 of the "Seller Negotiating/Trading agent(s)" 502 and its interactions with the "Mobile computing device/cloud platform for Seller negotiating/trading AI agents" 516 as well as the "Buyer Autonomous vehicle negotiating/trading AI agents" 522. The "Seller negotiating/trading AI agents" 502 is an embodiment of the "Seller Vehicle part manufacturers/resellers AI negotiating/trading agents" 103, the "Seller Vehicle fuel providers AI negotiating/trading agents" 104, the Seller Vehicle manufacturers/resellers AI negotiating/trading agents" 105, the "Seller Vehicle service providers AI negotiating/trading agents" 106, shown in FIG. 1, or any of the "Seller negotiating/trading AI agents" 424 shown in FIG. 4. The "Buyer Autonomous vehicle negotiating/trading AI agents" 522 is an embodiment of any of the "Buyer Autonomous vehicle negotiating/trading AI agents" 402, shown in FIG. 4. The functionality 500 of the "Seller negotiating/trading AI agents" 502 includes the "Mobile computing device/cloud platform for Seller negotiating/trading AI agents" 516 which creates or connects to an existing "Seller negotiating/trading AI agent(s)" 502 through the "Create and connect to a Seller negotiating/trading AI agents" 518 module. In one or more embodiments, the "Mobile computing device cloud platform for Seller negotiating/trading AI agents" 516 resides either inside the vehicle's computing device, inside a mobile device, inside a cloud platform, or any other future computational platform. The "Seller negotiating/trading AI agents" 502 maintains two way communications with the "Mobile computing device cloud platform for Seller negotiating/trading AI agents" 516. The "Seller negotiating/trading AI agent(s)" 502, receives data "Parts for replacement, Refueling required, Purchase of new/used vehicle, and/or Service required" 504 from the "Buyer autonomous vehicle Negotiating/trading AI agent(s)" 522. The "Buyer autonomous vehicle negotiating/trading AI agents" 522 transmit data including "Parts for replacement, refueling required, service required, purchase of new/used vehicle" 524 to the "Seller negotiating/trading AI agent(s)" 502. The "Seller negotiating/trading AI agents" 502 transmit "Offers to Buyer AI agents from Vehicle part manufacturer/reseller, Fuel provider, Vehicle manufacturer, Vehicle service provider" 505 to the "Buyer Autonomous vehicle negotiating/trading AI agents" 522. The "Buyer Autonomous vehicle negotiating/trading AI agent(s)" 522 receive "Offers from Vehicle part manufacturer/reseller, fuel provider, Vehicle manufacturer reseller, Vehicle service provider seller negotiating/trading AI agents" 525. The "Seller negotiating/trading AI agents" 502 maintains two ways communications to the internet social and customer review sites to receive web data "Web data for User reviews of vehicle parts, vehicle fuel providers, vehicle manufacturer new/used models, vehicle service providers, consumer reports, reported product lifespans, market demand, trend analysis, and other relevant data" 520. The "Seller negotiating/trading AI agent(s)" 502 locates all "Buyer Autonomous vehicle negotiating/trading AI agents" 522 requesting "parts for replacement, refueling required, service required, purchase of a new/used vehicle" 524, loops through all "the Buyer AI agents requests for vehicle parts, fuel, vehicle service, purchase of new/used vehicles" 506. For each "AI Buyer request" 508 from a "Buyer Autonomous vehicle negotiating/trading AI agent" 522, pass price, price elasticity, product specs, product stock information, user reviews, customer reviews, for the particular product being requested and other relevant parameters to a "Seller Machine learning, neural network, Training, validation, and execution" 510 to make a decision to sell or wait and proceed with the next "AI buyer request" 508. The "Seller Machine learning Neural Network, Training, Validation, and execution" 510 makes the decision to sell and "Receive payment, provide information for the vehicle part manufacturer/reseller, fuel provider, vehicle manufacturer, vehicle service provider" 510 to the "Buyer Autonomous vehicle negating/trading AI agent" 522 for fulfilling the particular "AI buyer request" 508. The decision to sell is made by "Seller Machine learning Neural Network, Training, Validation, and Execution" 510. A "Seller Natural Language Processing (NLP) Neural Network" 512 and a "Buyer Natural Language Processing (NLP) neural network" 528 allow for natural language negotiations between the "Seller Machine learning Neural Network, Training, Validation, and Execution" 510 and the "Buyer Machine Learning Neural Network, Training, validation, and execution" 526. The direct negotiation between the "Seller Machine learning Neural Network, Training, validation, and execution" 510 and the "Buyer Machine learning Neural Network, Training, Validation, and Execution" 526 provides the means for a price discovery which is optimum for both the "Seller Machine learning Neural Network, Training, validation, and execution" 510 and the "Buyer Machine learning Neural Network, Training, Validation, and Execution" 526. The "Seller Machine learning Neural Network, Training, validation, and execution" 510 is an embodiment of the "Seller Machine learning Neural Network, Training, validation, and execution" 428 in FIG. 4. The "Buyer Machine learning Neural Network, Training, Validation, and Execution" 526 is an embodiment of the "Buyer Machine learning Neural Network, Training, Validation, and Execution" 410 in FIG. 4. In one or more embodiments an owner intervention may be required for the "Seller negotiating/trading AI agents" 502 which is provided through the "Inform owner or sales system for the executed orders" 530.

Referring now to FIG. 6, a particular implementation 600 is shown of a "Buyer machine learning Neural Network, training, validation and execution" 410 of FIGS. 4, and 526 of FIG. 5. This particular implementation of the neural network constitutes an example of one of many possible neural network architectures. Neural networks are a set of algorithms, loosely modeled after the human brain, that are designed to recognize patterns; the basic functional unit of a neural network is a neuron which receives several inputs and produces output(s) weighted by the signal strength of each of the input(s); several neurons are placed adjacent to each other to form a network layer; the output(s) of each of the neurons in each layer, are either directed to an output layer, or to a different neuron layer to form another layer in the neural network; simple neural networks consist of one input layer and one output layer; deep neural networks consist of one input layer, one output layer, and several in-between layers (hidden layers); the layers in-between the input and the output layers provide several levels of abstraction which increase the accuracy and the range of recognizable inputs; providing the input signals and the expected output, the deep neural networks are trained to predict the output based on new inputs.

The particular implementation 600 of a "Buyer machine learning Neural Network, training, validation and execution" 601 includes a combination of two different deep learning networks, one deep learning networks 604 for making a purchase decision, and one deep learning networks 616 for not making a purchase decision, in combination with a reinforcement learning network consisting of a Q(state, a) 626 and a "Reward" 628. The value of making or not making a purchase decision is acquired through the combination of these two deep neural networks 604, and 616 with the help of a reinforcement learning network consisting of a "Q(state, a)" 626 matrix and a "Reward" 628. The objective of the "Buyer machine learning Neural Network training, validation and execution" 601 is to make a purchase with the best possible price. For this reason, the reinforcement learning part of the network is using the Q-learning algorithm, which is a matrix of states (state) and actions (a) "Q(state, a)" 626. The states are the input layer parameters 602 and 614 of the deep-neural networks consisting of part specs, product price elasticity parameters, known stock information for seller AI agents, and user reviews for vehicle parts, fuel providers, vehicle manufacturer models, service providers, consumer reports as well as lifespan data, and other relevant data. The actions are either to "make a purchase" decision 612 or "not to make a purchase" decision 624. A reward 628 is a-priori applied to each state-action pair. The rewards supplied to the reinforcement learner are large when the "Buyer machine learning Neural Network training, validation and execution" 601 makes a decision to purchase at the minimum historical price. For instance, the final reward could be calculated as the inverse of the difference between the price at which the reinforcement learner decided to buy and the minimum price that the particular product was sold (offered) as inferred from the historical data, used to train the network. This process is repeated until the Q (state, a) 626 matrix does not change based on all of the available historical data. The training of the network is validated, based on historical data not used in training. When the "Buyer machine learning Neural Network, training, validation and execution" 601 goes into production, it continues to train itself by looking back at the prices that decided to buy, and the minimum price that the product (i.e., vehicle part, refueling, service, new/used vehicle) was eventually bought at. The reward system could be designed to adopt the "Buyer machine learning Neural Network, training, validation and execution" 601 to specific buying strategies. The objective of a reinforcement learner, according to one or more embodiments, is to take the action at different states which will maximize the present value of all future rewards. The "Input layer" 606 and the "Output Layer" 612 constitute the input and output layers of the deep neural network 604 for making a purchase decision. The "Hidden Layer 1" 608 and the "Hidden Layer N" 610 constitute the 1-st and the N-th hidden layers of the deep neural network 604. The three dots " . . . " represent a variable number of hidden layers which will provide the optimum configuration of the deep neural network 604 for making a purchase.

Referring now to FIG. 7, a particular implementation 700 is shown of a "Seller machine learning Neural Network, training, validation and execution" 701 which is an embodiment of the "Seller Machine learning, Neural Network Training, validation, and execution" 428 of FIG. 4, and the "Seller Machine learning, Neural Network Training, validation, and execution" 510 of FIG. 5. This particular implementation of the neural network constitutes just an example of one of many possible neural network architectures. The particular implementation 700 includes a combination of two different deep learning networks, one deep learning network 704 for making a sale decision, and one deep learning network 716 for not making a sale decision, in combination with a reinforcement learning network consisting of the Q-Learning matrix "Q(state, a)" 726 and the "Reward" 728. The value of making or not making a sale decision is acquired through the combination of the two deep neural networks 704 and 716 and a reinforcement learning network 726/728. The objective of the "Seller machine learning Neural Network training, validation and execution" 701 is to make a sale with the highest possible price. For this reason the reinforcement learning part of the network is using the Q-learning algorithm, which is a matrix "Q(state, a)" 726 of states (state) and actions (a) 726. "Rewards" 728 are assigned to each action and state. The states are the input layer parameters of the deep-neural networks consisting of "part specs, product price elasticity parameters, sales targets, stock availability, margins, and user reviews for vehicle parts, fuel providers, vehicle manufacturer models, service providers, consumer reports as well as lifespan data, and other relevant data" 702 and 714. The actions are either to "Make a sale" decision 712 decision or "not to make a sale" decision 724. The "Reward" 728 supplied to the reinforcement learner is large when the "Seller machine learning Neural Network training, validation and execution" 701 makes a decision to make a sale at the highest possible historical price. For instance, the reward could be calculated as the inverse of the difference between the price at which the reinforcement learner decided to sell and the maximum price that the particular product was sold (offered) as inferred from the historical data, used to train the "Seller machine learning Neural Network Training, validation, and execution" 701. This process is repeated until the Q (state, a) matrix 726 does not change based on all of the available historical data. The training of the network is validated, based on historical data not used in training. When the "Seller machine learning Neural Network, training, validation and execution" 701 goes into production, it continues to train itself by looking back at the prices that decided to sell, and the maximum price that the product (i.e., vehicle part, refueling, service, new/used vehicle) was eventually sold. The reward system could be designed dynamically to adopt the "Seller machine learning Neural Network, training, validation and execution" 701 specific sales strategies. For instance, the rewards could be adjusted for the "Seller machine learning Neural Network Training, validation and execution" 701 to increase the sales when inventories, and increase prices when the inventories are very tight. The "Input layer" 706 and the "Output Layer" 712 constitute the input and output layers of the neural network 704 for making a decision to sell. The "Hidden layer 1" 708 and the N-th "Hidden layer N" 710 constitute the hidden layers of the neural network 704. The " . . . " indicate that the number of hidden layers between the 1-st hidden layer 708 and N-th hidden layer 710 is variable. Through experimentation, the exact number of the hidden layers is determined by achieving the optimum deep neural network 704 performance. The "Input Layer" 718 and the "Output Layer" 724 constitute the input and output layers of the neural network 716 for making a decision not to make a sale. The "Hidden layer 1" 720 and the N-th "Hidden layer N" 722 constitute the hidden layers of the neural network 716. The " . . . " indicate that the number of hidden layers from the 1-st hidden layer 720 to the N-th hidden layer 722 is variable. Through experimentation, the exact number of the hidden layers is determined by achieving the optimum deep neural network 716 performance.

In at least some embodiments, the "Autonomous vehicle sensor health/fuel Monitoring AI Agent(s)" 201/301 of FIGS. 2 and 3 respectively, the "Buyer Autonomous vehicle negotiating/trading AI agents" 402, and "Seller negotiating/trading AI agent(s)" 502 respectively, as well as the "Buyer machine learning Neural Network, training, validation and execution" 601, the "Seller machine learning Neural Network, training, validation and execution" 701, "Buyer Natural Language Processing (NLP)" neural network 412 and "Seller Natural Language Processing (NLP)" neural network 512 are able to establish one or two-way communications with each other on an as-needed, on-demand, ad hoc, or periodic basis, in place of maintaining two-way communications. In at least some embodiments, one or more of the "Autonomous vehicle sensor health/fuel Monitoring AI Agent(s)" 201/301, the "Buyer Autonomous vehicle negotiating/trading AI agents" 402, and "Seller negotiating/trading AI agent(s)" 502, as well as the "Buyer machine learning Neural Network, training, validation and execution" 601, the "Seller machine learning Neural Network, training, validation and execution" 701, the "Buyer Natural Language Processing (NLP)" neural network 412 and the "Seller Natural Language Processing (NLP)" neural network 512 may communicate in one or more of the foregoing list of communication standards. The communication among all these agents is achieved either through short range Bluetooth communication standards (i.e., IEEE 802.15.1), WiFi (i.e., 802.11 a/b/g/n/ac), 3G (up to 2 Mbs), 4G (up to 100 Mbps), 5G (up to 1 Gbps), or other future emerging wireless and/or wireline networks.

Referring now to FIG. 8, an example of a lifespan prediction model is based on neural networks. One embodiment of the architecture 800 of a "Deep neural network" 804 includes one "Input layer" 806, consisting of "Part specs Sensor recorded data, user reviews, and other relevant data" 802, one "Output layer" 814 consisting of "Lifespan with probability, Max lifespan, Other relevant output" 816, and several hidden layers, that is, "Hidden layer 1" 808, "Hidden layer 2" 810, and Hidden layer N" 812. The " . . . " indicate that the number of hidden layers from the 1-st hidden layer 808 to the N-th hidden layer 812 is variable. Through experimentation, the exact number of the hidden layers is determined by achieving the optimum deep neural network 804 performance. In one example, the "Autonomous vehicle Sensor Health/Fuel monitoring AI agent(s)" 201 shown in FIG. 2, store both the time passed since the new tires were installed and the input sensor data from the vehicle accelerometers, potholes detected, and the tire tread level. This dataset also includes historical tire replacement times and the historical times for the lifespan of each of the vehicle tires. The "Autonomous vehicle Sensor Health/Fuel monitoring AI agent(s)" 201 transfers this historical dataset to the "Analyze received data, determine parts for replacement, using neural networks and machine learning" 202 module which feeds the historical sensor data and other relevant historical data as input signals to the deep neural network 804, and the historical lifespans are fed as output signals. With these input and output signals this trained neural network will be able to predict the tire lifespan of each of the vehicle tires based on new input signals (i.e., new sensor information, and other new relevant data); this approach can be extended to include the input sensor data for all vehicle parts (e.g., brake pads, lights, batteries for electric or hybrid vehicles, or the like); using known inputs and known outputs to train the neural network is a type of learning, referred to as "supervised learning"; Another type of learning is the so called "unsupervised learning" where the data are categorized in clusters with each cluster having specific characteristics; for instance having the tire sensor data, the accelerometer data, and the lifespan of different types and brand of tires, all these data can be clustered according to the sensor data and the lifespan; these clusters will reveal concentration of lifetimes around brands, tire rubber quality, season of the year etc., which in turn will be used to further improve to accuracy of the lifespan predictions for the tires; the analysis of large amounts of data to associate inputs to outputs and predict outputs for new inputs either through neural networks or various statistical techniques (i.e., regression, correlation analysis, etc.) are referred to as "data analytics".

In some embodiments, a lifespan prediction model is based on a Bayesian Network (BN) method. This method considers the correlation between accidental failures performance degradation, and other failure mechanisms, and achieves system modeling and lifetime prediction under complex logic operations [1-2]; an example for an input to this model includes the a-priori probability of part failures, and initial part performance parameters. For example, initial part performance parameters consist of and are not limited to initial degradation performance rate, environmental dependent diffusion coefficients, manufacturer experimental data, and reasonable expert data. For fluid level monitoring (e.g., fuel level, brake fluid levels, etc.), fluid level digital readers will monitor the fluid levels at all times and predict the lifespan of the vehicle fuel(s); all this information is transferred to the "Autonomous vehicle Sensor Health/Fuel monitoring AI agent(s)" 201/301 of FIGS. 2, and 3 respectively via the vehicle Local Interconnect Network (LIN—up to 10-20 Kbit/s or higher), Controller Area Network (CAN—up to 50-100 Mbit/s or higher), and Ethernet at 100 Mbit/s or higher. Based on the real-time sensor data the "Autonomous vehicle Sensor Health/Fuel monitoring AI agent(s)" 201/301 will estimate new performance degradation parameters, and estimate the remaining lifetime and associated probabilities of parts and/or system failures. For vehicle tires, for instance, the manufacturer initial lifespan estimate might be 60 miles; the tire tread sensor will provide to the "Autonomous vehicle Sensor Health/Fuel monitoring AI agent(s)" 201 tire tread length in real-time; the "Autonomous vehicle Sensor Health/Fuel monitoring AI agent(s)" 201 will combine this information through the with the miles travelled to compute an updated estimate of the actual tire-tread performance as well as the expected time for tire failures and the associated probabilities; in addition, the "Autonomous vehicle Sensor Health/Fuel monitoring AI agent(s)" 201 will be receiving information from the Vehicle's vertical accelerometers which will help to estimate the roughness of the road and the number of pot-holes that the vehicle encounters; this information will constitute an additional input for estimating more accurately the probability and the expected lifetime of tire failures; all this information is stored and constitutes the historical information (data). This information is subsequently utilized by the "Autonomous vehicle Sensor Health/Fuel monitoring AI agent(s)" 201 to establish more accurate starting values for the expected failure times and the associated probabilities of failure; additional input data for improving expected failure times and associated probabilities include data extracted from the web or other data sources containing customer reviews, and/or reported lifespan of the specific vehicle parts and/or quality of different brand vehicle parts;

In one or more embodiments, the Seller Negotiating/trading AI agents can be Seller Parts Manufacturer/reseller Negotiating/trading AI agents. Referring now to FIG. 9, an embodiment of the communication mechanism 900 between "Buyer Autonomous Vehicle negotiating/trading AI agent(s)" 902 and the "Seller Parts Manufacturer/reseller Negotiating/trading AI agents includes "Autonomous vehicle sensor health/fuel monitoring AI agent(s)" 201/301 as described in FIGS. 2-3, which receives data including Vehicle part sensor data, user reviews, expected parts lifespan, and other relevant data and transmits data of "Vehicle parts for replacement" to the "Buyer Autonomous Vehicle negotiating/trading AI agent(s)" 902. "Buyer Autonomous vehicle negotiating/trading AI agent(s)" 902, whose detailed functionality described above (FIGS. 4, 6), receives data of "Parts for replacement" from the "Autonomous vehicle sensor health/fuel monitoring AI agent(s)" 901 as well as offers from Seller negotiating/trading AI agents and transmits data of Decision to make or not make a purchase. Additionally, the "Buyer Autonomous vehicle negotiating/trading AI agent(s)" 902 maintains two-way communications with the "Autonomous vehicle sensor health/fuel monitoring AI agent(s)" 901 and all "Seller Vehicle part manufacture/reseller AI agent(s)" 906, 910, 914, 918, 922, and 926. The communication mechanism 900 also includes a "Cloud computing and/or negotiating/trading platform" 904 which maintains two-way communications with the "Buyer Autonomous vehicle negotiating/trading AI agent(s)" 902. The "Cloud computing and/or negotiating/trading platform" 904 provides, on an as needed basis, the required computational resources to achieve effective operation of the "Autonomous vehicle negotiating/trading AI agent(s)" 902. The communication mechanism 900 additionally includes multiple Seller Vehicle part manufacturer/reseller negotiating/trading AI agent(s) 906, 910, 914, 918, 922, and 926, whose detailed functionality according to some embodiments, described above in embodiments from FIGS. 5 and 7, receive data of "Request for purchasing a vehicle part" from the "Buyer Autonomous vehicle negotiating/trading AI agent(s)" 902 and transmit data of "Offer to sell a vehicle part."; The multiple Seller Vehicle part manufacturer/reseller negotiating/trading AI agents 906, 910, 914, 918, 922, and 926 maintain two-way communications with the "Buyer Autonomous vehicle negotiating/trading AI agent(s)." 902. The communication mechanism 900 further includes multiple "Cloud computing and/or negotiating/trading platforms" 904, 908, 912, 916, 920, 924, and 928 which respectively maintain two-way communications with one of the multiple Seller Vehicle part manufacturer/reseller negotiating/trading AI agents 906, 910, 914, 918, 922, and 926. These "Cloud computing and/or negotiating/trading platforms" 908, 912, 916, 920, 924, and 928 provide, on an as needed basis, the required computational resources to achieve effective operation of the multiple Seller Vehicle part manufacturer/reseller negotiating/trading AI agents 906, 910, 914, 918, 922, and 926.

In at least some embodiments, "Autonomous vehicle sensor health/fuel monitoring AI agent(s)" 901 is the same as or different than "Autonomous vehicle sensor health/fuel monitoring AI agent(s)" 101 in FIG. 1, 201 in FIG. 2, 301 in FIG. 3, or 416 in FIG. 4 respectively. In at least some embodiments, "Buyer Autonomous Vehicle negotiating/trading AI agent(s)" 902 is the same as or different than "Buyer Autonomous Vehicle negotiating/trading AI agent(s)" 102 in FIG. 1, 202 in FIG. 2, 302 in FIG. 3, 402 in FIG. 4, or 522 in FIG. 5 respectively. In at least some embodiments, "Cloud computing and/or negotiating/trading platforms" 904, 908, 912, 916, 920, 924, 928 are the same or different. In at least some embodiments, agents "Autonomous vehicle sensor health/fuel monitoring AI agent(s)" 901, "Buyer Autonomous Vehicle negotiating/trading AI agent(s)" 902, and Seller Vehicle part manufacturer/reseller negotiating/trading AI agents 906, 910, 914, 918, 922, and 926 are able to establish one or two-way communications with each other on an as-needed, on-demand, ad hoc, or periodic basis, in place of maintaining two-way communications. In at least some embodiments, "Buyer Autonomous Vehicle negotiating/trading AI agent(s)" 902, and Seller Vehicle part manufacturer/reseller negotiating/trading AI agents 906, 910, 914, 918, 922, and 926 are able to establish one or two-way communications with corresponding platforms, 904, 908, 912, 916, 920, 924, and 928 on an as-needed, on-demand, ad hoc, or periodic basis, in place of maintaining two-way communications; the communication among all these agents is achieved either through short range Bluetooth communication standards (i.e., IEEE 802.15.1), WiFi (i.e., 802.11 a/b/g/n/ac), 3G (up to 2 Mbs), 4G (up to 100 Mbps), 5G (up to 1 Gbps), wireline or other future emerging wireline or wireless networks.

In one or more embodiments, the Seller Negotiating/trading AI agents can be Seller/Reseller Fuel Negotiating/trading AI agents. Referring now to FIG. 10, an embodiment of the communication mechanism 1000 between "Buyer Autonomous Vehicle negotiating/trading AI agent(s)" 1002 and Seller/Reseller Fuel Negotiating/Trading AI agents includes the "Autonomous vehicle sensor health/fuel monitoring AI agent(s)" 1001, as described above in FIGS. 2 and 3, which receives data including "Vehicle part sensor data, user reviews, expected parts lifespan, and other relevant data" and transmits data of "Refueling required" to the "Buyer Autonomous Vehicle negotiating/trading AI agent(s)" 1002. "Buyer Autonomous vehicle negotiating/trading AI agent(s)" 1002, as described above in FIGS. 4, and 6, receive data of "Refueling required" from the "Autonomous vehicle sensor health/fuel monitoring AI agent(s)" 1001, as well as offers from Seller/Reseller fuel negotiating/trading AI agents 1006, 1010, 1014, 1018, 1022, 1026 and transmits data of "Decision to make or not make a purchase". The "Buyer Autonomous vehicle negotiating/trading AI agent(s)" 1002 maintains two-way communications with the "Autonomous vehicle sensor health/fuel monitoring AI agent(s)" 1001 and all "Seller/Reseller Vehicle fuel negotiating/trading AI agent(s)" 1006, 1010, 1014, 1018, 10122, 1026; The communication mechanism 1000 also includes a "Cloud computing and/or negotiating/trading platform" 1004 which maintains two-way communications with the "Buyer Autonomous vehicle negotiating/trading AI agent(s)" 1002. This cloud platform provides, on an as needed basis, the required computational resources to achieve effective operation of the "Autonomous vehicle negotiating/trading AI agent(s)" 1002. The communication mechanism 1000 additionally includes multiple "Seller/reseller fuel negotiating/trading AI agent(s)" 1006, 1010, 1014, 1018, 1022, 1026, whose detailed functionality according to some embodiments, described above in FIGS. 5 and 7, receives data of "Request for refueling" from the "Buyer Autonomous vehicle negotiating/trading AI agent(s)" 1002 and transmit data of "Offer to sell fuel". The multiple "Seller/reseller fuel negotiating/trading AI agent(s)" 1006, 1010, 1014, 1018, 1022, and 1026 maintain two-way communications with the "Buyer Autonomous vehicle negotiating/trading AI agent(s)" 1002. The communication mechanism 1000 additionally includes multiple "Cloud computing and/or negotiating/trading platform" 1008, 1012, 1016, 1020, 1024, and 1028 which respectively maintain two-way communications with one of the multiple "Seller/reseller fuel negotiating/trading AI agent(s)" 1006, 1010, 1014, 1018, 1022, and 1026. These cloud platforms provide, on an as needed basis, the required computational resources to achieve effective operation of the multiple "Seller/reseller fuel negotiating/trading AI agent(s)" 1006, 1010, 1014, 1018, 1022, and 1026.

In at least some embodiments, "Autonomous vehicle sensor health/fuel monitoring AI agent(s)" 1001 is the same as "Autonomous vehicle sensor health/fuel monitoring AI agent(s)" 101, 201, 301, and 416 described in FIG. 1, FIG. 2, FIG. 3, and FIG. 4 respectively. In at least some embodiments, "Buyer Autonomous vehicle negotiating/trading AI agent(s)" 1002 is the same as "Buyer Autonomous vehicle negotiating/trading AI agent(s)" 102, 202, and 302, 402, and 522 described in FIG. 1, FIG. 2, FIG. 3, FIG. 4, and FIG. 5 respectively. In at least some embodiments, "Cloud computing and/or negotiating/trading platform" 1004, 1008, 1012, 1016, 1020, 1024, and 1028 are the same or different. In at least some embodiments, agents "Autonomous vehicle sensor health/fuel monitoring AI agent(s)" 1001, "Buyer Autonomous vehicle negotiating/trading AI agent(s)" 1002, and the multiple "Seller/reseller fuel negotiating/trading AI agent(s)" 1006, 1010, 1014, 1018, 1022, and 1026 are able to establish one or two-way communications with each other on an as-needed, on-demand, ad hoc, or periodic basis, in place of maintaining two-way communications. In at least some embodiments, "Buyer Autonomous vehicle negotiating/trading AI agent(s)" 1002 and the multiple "Seller/reseller fuel negotiating/trading AI agent(s)" 1006, 1010, 1014, 1018, 1022, and 1026 are able to establish one or two-way communications with corresponding "Cloud computing and/or negotiating/trading platforms" 1004, 1008, 1012, 1016, 1020, 1024, and 1028, on an as-needed, on-demand, ad hoc, or periodic basis, in place of maintaining two-way communications; the communication among all these agents is achieved either through short range Bluetooth communication standards (i.e., IEEE 802.15.1), WiFi (i.e., 802.11 a/b/g/n/ac), 3G (up to 2 Mbs), 4G (up to 100 Mbps), 5G (up to 1 Gbps), wireline or other future emerging wireless or wireline networks.

In one or more embodiments, the Seller Negotiating/trading AI agents can be Seller/Reseller of new/used vehicles negotiating/trading AI agents. Referring now to FIG. 11, an embodiment of the communication mechanism 1100 between "Buyer Autonomous Vehicle negotiating/trading AI agent(s)" 1102 and Seller/Reseller of new/used vehicles negotiating/trading AI agents includes "Autonomous vehicle sensor health/fuel monitoring AI agent(s)" 1101, as described in FIG. 2-3, which receives data including "Vehicle part sensor data, user reviews, expected parts lifespan, and other relevant data" and transmits data of "Time to buy a new/used vehicle" to the "Buyer Autonomous Vehicle negotiating/trading AI agent(s)" 1102. The "Buyer Autonomous vehicle negotiating/trading AI agent(s)" 1102, as described in FIGS. 4 and 6, receives data of "Time to buy a new/used vehicle" from the "Autonomous vehicle sensor health/fuel monitoring AI agent(s)" 1101 as well as offers from "Seller/reseller of new/used vehicle negotiating/trading AI agents" and transmits data of "Decision to make or not make a purchase". The "Buyer Autonomous vehicle negotiating/trading AI agent(s)" 1102 maintains two-way communications with the "Autonomous vehicle sensor health/fuel monitoring AI agent(s)" 1101 and all "Seller/Reseller of new/used vehicles negotiating/trading AI agent(s)" 1106, 1110, 1114, 1118, 1122, and 1126. The communication mechanism 1100 also includes a "Cloud computing and/or negotiating/trading platform" 1104 which maintains two-way communications with the "Buyer Autonomous vehicle negotiating/trading AI agent(s)" 1102. This cloud platform provides, on an as needed basis, the required computational resources to achieve effective operation of the "Autonomous vehicle negotiating/trading AI agent(s)" 1102. The communication mechanism 1100 additionally includes multiple "Seller/reseller of new/used vehicles negotiating/trading AI agents" 1106, 1110, 1114, 1118, 1122, and 1126, whose detailed functionality, according to some embodiments, is described in FIGS. 5 and 7, receive data of "Request for buying a new/used vehicle" from the "Buyer Autonomous vehicle negotiating/trading AI agent(s)" 1102 and transmits data of "Offer to sell a new/used vehicle". The multiple "Seller/reseller of new/used vehicles negotiating/trading AI agents" 1106, 1110, 1114, 1118, 1122, and 1126 maintain two-way communications with the "Buyer Autonomous vehicle negotiating/trading AI agent(s)" 1102. The communication mechanism 1100 further includes multiple "Cloud computing and/or negotiating/trading platform" 1104, 1108, 1112, 116, 1120, 1124, Ind 1128 respectively maintain two-way communications with the "Buyer Autonomous Vehicle negotiating/trading AI agent(s)" 1102 and one of the multiple "Seller/reseller of new/used vehicles negotiating/trading AI agents" 1106, 1110, 1114, 1118, 1122, and 1126. These cloud platforms provide, on an as needed basis, the required computational resources to achieve effective operation of "Buyer Autonomous Vehicle negotiating/trading AI agent(s)" 1102 and the multiple "Seller/reseller of new/used vehicles negotiating/trading AI agents" 1106, 1110, 1114, 1118, 1122, and 1126.

In at least some embodiments, "Autonomous vehicle sensor health/fuel monitoring AI agent(s)" 1101 is the same as "Autonomous vehicle sensor health/fuel monitoring AI agent(s)" 101, 201, 301, and 416 described in FIG. 1, FIG. 2, FIG. 3, and FIG. 4 respectively. In at least some embodiments, "Buyer Autonomous vehicle negotiating/trading AI agent(s)" 1102 is the same as "Buyer Autonomous vehicle negotiating/trading AI agent(s)" 102, 202, and 302, 402, and 522 described in FIG. 1, FIG. 2, FIG. 3, FIG. 4, and FIG. 5 respectively. In at least some embodiments, "Cloud computing and/or negotiating/trading platform" 1104, 1108, 112, 116, 1120, 1124, and 1128 are the same or different. In at least some embodiments, agents "Autonomous vehicle sensor health/fuel monitoring AI agent(s)" 1101, "Buyer Autonomous vehicle negotiating/trading AI agent(s)" 1102, and the multiple "Seller/reseller of new/used vehicles negotiating/trading AI agents" 1106, 1110, 1114, 1118, 1122, and 1126 are able to establish one or two-way communications with each other on an as-needed, on-demand, ad hoc, or periodic basis, in place of maintaining two-way communications. In at least some embodiments, "Buyer Autonomous vehicle negotiating/trading AI agent(s)" 1102, and the multiple "Seller/reseller of new/used vehicles negotiating/trading AI agents" 1106, 1110, 1114, 1118, 1122, and 1126 are able to establish one or two-way communications with corresponding "Cloud computing and/or negotiating/trading platform" 1104, 1108, 112, 116, 1120, 1124, and 1128, on an as-needed, on-demand, ad hoc, or periodic basis, in place of maintaining two-way communications; the communication among all these agents is achieved either through short range Bluetooth communication standards (i.e., IEEE 802.15.1), WiFi (i.e., 802.11 a/b/g/n/ac), 3G (up to 2 Mbs), 4G (up to 100 Mbps), 5G (up to 1 Gbps), wireline or other future emerging wireless networks.

In one or more embodiments, the Seller Negotiating/trading AI agents can be vehicle service provider Negotiating/trading AI agents. Referring now to FIG. 12, an embodiment of the communication mechanism 1200 between "Buyer Autonomous Vehicle negotiating/trading AI agent(s)" and Vehicle service provider Negotiating/Trading AI agents includes the "Autonomous vehicle sensor health/fuel monitoring AI agent(s)" 1201, as described in FIG. 2-3, receives data including "Vehicle part sensor data, user reviews, expected parts lifespan, and other relevant data" and transmits data of "Time for servicing the vehicle" to the "Buyer Autonomous Vehicle negotiating/trading AI agent(s)" 1202. The "Buyer Autonomous vehicle negotiating/trading AI agent(s)" A02, as described in FIGS. 4 and 6, receives data of "Time to service the vehicle" from the "Autonomous vehicle sensor health/fuel monitoring AI agent(s)" 1201 as well as offers from vehicle service providers negotiating/trading AI agents and transmits data of "Decision to make or not make a service purchase" The "Buyer Autonomous vehicle negotiating/trading AI agent(s)" 1202 maintains two-way communications with the "Autonomous vehicle sensor health/fuel monitoring AI agent(s)" 1201 and all "vehicle service provider negotiating/trading AI agents" 1206, 1210, 1214, 1218, 1222, and 1226. The communication mechanism 1200 also includes a "Cloud computing and/or negotiating/trading platform" 1204 which maintains two-way communications with the "Buyer Autonomous vehicle negotiating/trading AI agent(s)" 1202. This cloud platform provides, on an as needed basis, the required computational resources to achieve effective operation of the "Autonomous vehicle negotiating/trading AI agent(s)" 1202. The communication mechanism 1200 additionally includes multiple seller "Vehicle service provider negotiating/trading AI agents" 1206, 1210, 1214, 1218, 1222, and 1226, whose detailed functionality, according to some embodiments, is described in FIGS. 5 and 7, receive data of "Request for servicing the vehicle" from the "Buyer Autonomous vehicle negotiating/trading AI agents" 1202 and transmits data of "Offer to service the vehicle". The multiple Seller "Vehicle service provider negotiating/trading AI agents" 1206, 1210, 1214, 1218, 1222, and 1226 maintain two-way communications with the "Buyer Autonomous vehicle negotiating/trading AI agent(s)" 1202. The communication mechanism 1200 further includes multiple "Cloud computing and/or negotiating/trading platforms" 1208, 1212, 1216, 1220, 1200, and 1228 which respectively maintain two-way communications with one of the multiple "vehicle service provider negotiating/trading AI agents" 1206, 1210, 1214, 1218, 1222, and 1226. These "Cloud computing and/or negotiating/trading platforms" provide, on an as needed basis, the required computational resources to achieve effective operation of the multiple seller "vehicle service provider negotiating/trading AI agents" 1206, 1210, 1214, 1218, 1222, and 1226.

In at least some embodiments, "Autonomous vehicle sensor health/fuel monitoring AI agent(s)" 1201 is an embodiment or the same as "Autonomous vehicle sensor health/fuel monitoring AI agent(s)" 101 described in FIG. 1). "Buyer Autonomous vehicle negotiating/trading AI agent(s)" 1202 is an embodiment or the same as "Buyer Autonomous vehicle negotiating/trading AI agent(s)" 102 described in FIG. 1. In at least some embodiments, "Cloud computing and/or negotiating/trading platforms" 1204, 1208, 1212, 1216, 1220, 1224, and 1228 are the same or different. In at least some embodiments, agents "Autonomous vehicle sensor health/fuel monitoring AI agent(s)" 1201, "Buyer Autonomous vehicle negotiating/trading AI agent(s)" 1202, and the multiple seller "vehicle service provider negotiating/trading AI agents" 1206, 1210, 1214, 1218, 1222, and 1226 are able to establish one or two-way communications with each other on an as-needed, on-demand, ad hoc, or periodic basis, in place of maintaining two-way communications. In at least some embodiments, agents "Buyer Autonomous vehicle negotiating/trading AI agent(s)" 1202, and the multiple seller "vehicle service provider negotiating/trading AI agents" 1206, 1210, 1214, 1218, 1222, and 1226 are able to establish one or two-way communications with corresponding "Cloud computing and/or negotiating/trading platforms" 1204, 1208, 1212, 1216, 1220, 1224, and 1228, on an as-needed, on-demand, ad hoc, or periodic basis, in place of maintaining two-way communications; the communication among all these agents is achieved through one or multiple of the following communication standards including and not limited to short range Bluetooth communication standards (i.e., IEEE 802.15.1), WiFi (i.e., 802.11 a/b/g/n/ac), 3G (up to 2 Mbs), 4G (up to 100 Mbps), 5G (up to 1 Gbps), wireline or other future emerging wireless networks.

Referring now to FIG. 13, an example of vehicle computing devices (attached to the vehicle or mobile devices inside the vehicle) and application servers (stand alone on premises or residing inside the cloud platforms where all AI agents reside and operate) architecture 1300. It possible for a single or more AI agents to reside in a vehicle computing platform or a mobile device inside the vehicle. The architecture 1300 includes: an interface between the memory and the processor 1302, which also includes input output hardware as well as network interface hardware; a memory where the computer instructions/temporary data for any of the AI agents (i.e., health/fuel monitoring AI agents, negotiating/trading agents, etc.) are stored 1304; computer machine language instructions (stored in memory) required for any of the AI agent computations 1306 and Machine learning Neural Network Training, validation and execution 1308; temporary data available in memory for the current AI agent computations 1310; Input/output hardware for storing and retrieving computer instructions/data, stored in permanent storage (e.g., local or remote hard disk, other permanent memory storage devices) 1312; a processor (e.g., Central Processing Unit (CPU), or Graphics Processing Unit (GPU)) where the computer instructions for any of the AI agent computations are executed 1314; a network interface for storing and/or retrieving computer instructions/data over a local or widely distributed network 1316; and a local or widely distributed network for facilitating all computational needs including computer instructions/data (storage, retrieval) for any of the AI agents 1320. The computer machine language instructions for the "Autonomous vehicle sensor health/fuel monitoring AI agents", "Buyer Autonomous vehicle negotiating/trading AI agents", "Seller vehicle part manufacturers/resellers negotiating/trading AI gents", "Seller vehicle fuel providers negotiating/trading AI agents", "Seller Vehicle manufacturers/resellers negotiating/trading AI agents", "Seller vehicle service providers negotiating trading AI agents" as well as the "Machine learning Neural Network Training validation, and execution" are stored in the permanent storage 1302. All Seller/Buyer negotiating/trading AI agent data (e.g., product specs, product prices, price elasticity parameters, product stock information and other relevant parameters) are stored in the permanent storage 1302 as well. These computer machine language instructions 1306, and 1308, as well as the required data 1310 are loaded into the application server memory 1304 through the memory interface 1302. The processor (e.g., CPU or GPU) 1314 retrieves the execution instructions from memory 1304, translates the execution instructions into a series of computer commands, executes the computer commands, and send the results back to memory 1304. Any data for the "AI negotiating/trading AI agents" 1310 updated through the instruction execution by the processor 1314 are stored back into the I/O 1312. In one or more embodiments the different negotiating/trading AI agents may be residing in different servers and different computer devices (FIG. 9 through FIG. 12). In those cases, the "AI negotiating/trading AI agents" are communicating with each other the wide/local area "Network" 1320. The "Optional interface to Autonomous vehicle owners for any required manual approvals" 1322 provides the interface for possible manual approvals of the buyer and seller negotiating/trading AI agent owners (i.e., "Inform vehicle owner of execution plan owner or not approval" 432 of FIG. 4, or "Inform owner or sales system for the executed orders" 530 of FIG. 5).

The architecture of the cloud platform "Cloud computing and/or AI negotiating/trading platform" 1400, disclosed in FIG. 14, is an embodiment of a "Cloud Computing and/or negotiating/trading platform" 904, 908, 912, 916, 920, 924, and 928 of FIGS. 9, 1004, 1008, 1012, 1016, 1020, 1024, and 1028 of FIGS. 10, 1104, 1108, 1112, 1116, 1120, 1124, and 1128 of FIGS. 11, and 1204, 1208, 1212, 1216, 1220, 1224, and 1228 of FIG. 12. The request of computational resources for the execution of the health/fuel monitoring AI agents and/or Buyer/Seller negotiating/trading AI agents is directed to the load balancers "Load Balancer 1" 1404, "Load Balancer 2" 1406, . . . "Load Balancer N" 1406. The function of the load balancers is to distribute the execution of the AI agents evenly among the "Application Server 1 (real or virtual)" 1410, "Application Server 2 (real or virtual)" 1412, . . . "Application Server N (real or virtual)" 1414. For this purpose, the load balancers maintain two-way communications with all application servers of the cloud platform, and keep track of the availability of computational resources for each server. If computational resources are available on one or more application servers, the load balancers will assign the execution of the AI agents to those servers, ensuring that the execution of the AI agents is evenly distributed among all servers which have availability of computational resources. If computational resources are not available for any of the cloud servers, the load balancers will wait until computational resources become available. For this purpose, the load balancers keep track and monitor on a continuous basis the availability of computational resources for all servers in the cloud platform. Each of the application servers maintain two way computations with a data storage "Artificial intelligence Agent and Customer data" 1416. This data storage keeps all the data required for the execution of the AI agents including customer data as well. The present disclosure is not limited to any specific cloud architecture platform or any individual Application servers, operating systems, or virtual Application servers. Any other cloud architecture, or computational platform consisting of one or multiple real or virtual Application servers which will be able to perform the required computations for the operation of the AI agents disclosed in FIGS. 1 through 12 are covered through the current disclosure.

An agent-based system for servicing vehicles comprising of: at least one vehicle including one or more actuators one or more autonomous agents executed on the vehicle for receiving information from the one or more actuators wherein, the one or more autonomous agents communicates with one or more outside agents outside the vehicle to obtain one or more services for the vehicle wherein the one or more services comprise at least one of obtaining a part for the vehicle, refueling the vehicle, obtaining maintenance of the vehicle, or acquiring another vehicle, and the one or more autonomous agents communicates with the one or more outside agents to obtain a price, quality, value or combination thereof for the one or more services through negotiation, trade, or auction or a combination thereof.

In at least some embodiments, at least one of the one or more autonomous agents is an autonomous vehicle sensor health/fuel monitoring AI agent configured to autonomously monitor a condition of one or more vehicle parts and predict a time when the one or more services are required. In at least some embodiments, the one or more vehicle parts comprise one or more tires, oil, brakes, fuel, batteries, transmissions, or other vehicle parts as identified by vehicle technology. In at least some embodiments, the vehicle is an electric vehicle or a hydrogen fuel cell vehicle or other vehicles using fuel as identified by vehicle technology.

In at least some embodiments, the one or more deep learning networks include one input layer, one or more hidden layers, and one output layer.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an agent-based system for servicing vehicles may include of: at least one vehicle including one or more actuators one or more autonomous agents executed on the vehicle for receiving information from the one or more actuators where Other embodiments of this aspect include corresponding computer systems, apparatus, and computer programs recorded on one or more computer storage devices, each configured to perform the actions of the methods.

Implementations may include one or more of the following features. The system where at least one of the one or more autonomous agents is an autonomous vehicle sensor health/fuel monitoring ai agent configured to autonomously monitor a condition of one or more vehicle parts and predict a time when the one or more services are required. The one or more vehicle parts may include one or more tires, oil, brakes, fuel, batteries, transmissions, or other vehicle parts as identified by vehicle technology. The condition of one or more vehicle part includes: conditions of the one or more tires may include at least one of: one or more of tire pressure, tread thickness, or other tire condition relevant and tire condition miscellaneous data; or conditions of the oil may include at least one of: one or more of oil fuel level, oil quality, oil conductivity, oil thickness, soot concentration, or other oil condition relevant or oil condition miscellaneous data; or conditions of one or more brakes may include at least one of: one or more of brake pad thickness, brake rotor thickness, brake fluid resistance, brake fluid level capacitance, or other brake condition relevant or brake condition miscellaneous data; or conditions of the fuel may include at least one of: one or more of fuel level, fuel resistance, fuel level capacitance, or other fuel level and fuel condition miscellaneous data; or conditions of one or more batteries may include at least one of: cell circuit current levels, cell voltage levels, cell temperature, or other battery condition relevant or battery related miscellaneous data; or conditions of one or more transmissions may include at least one of: shaft speed data, clutch/brake data, turbine data or other of transmission condition relevant or transmission related miscellaneous data. A mobile device or a cloud computational platform is configured to create one or more seller autonomous vehicle negotiating/trading ai agents. The system may include: an internet, one or more buyer machine learning neural networks, training, validation and execution, one or more natural language processing neural networks, and one or more seller machine learning neural networks, training, validation, and execution, and one or more seller natural language processing neural networks. The autonomous vehicle sensor health/fuel monitoring ai agents is configured to establish two way communications with the one or more buyer autonomous vehicle negotiating/trading ai agents. The one or more buyer autonomous vehicle negotiating/trading ai agents are configured to establish two way communications with: the internet; the one or more buyer machine learning neural networks, training, validation and execution; the one or more natural language processing neural networks; the one or more seller negotiating/trading ai agents; the one or more seller machine learning neural networks, training, validation, and execution; the one or more seller natural language processing neural networks; and one or more cloud computing platforms. The one or more buyer autonomous vehicle negotiating/trading ai agents are configured to establish two way communications with a vehicle owner for approval and/or information of any pending buying execution plans. The one or more buyer autonomous vehicle negotiating/trading ai agents are configured to receive one or more of: data showing that the one or more services are required from one or more autonomous vehicle sensor health/fuel monitoring ai agents; or one or more selling offers from the one or more of seller negotiating/trading ai agents, where the one or more seller negotiating/trading ai agents include: one or more seller vehicle part manufacturer/reseller ai agents; one or more seller fuel provider negotiating/trading ai agents; one or more seller manufacturer/reseller of new/used vehicle negotiating/trading ai agents; or any other seller vehicle service provider negotiating/trading ai agents; or one or more of internet data including: user product reviews for vehicle parts; user reviews for vehicle fuel providers; user reviews for vehicle manufacturer models; and user reviews for vehicle service providers; new product or service announcements; vehicle model part lifespans; manufacturer vehicle model lifespans; or other product relevant data. The one or more buyer autonomous vehicle negotiating/trading ai agents are configured to retrieve product price and quality elasticity parameters from a user database, stored in at least one of: a vehicle computing device, in a mobile device, or in a cloud computing platform. The one or more buyer autonomous negotiating trading ai agents are configured to loop through all the one or more selling offers from the one or more seller negotiating/trading ai agents. The one or more buyer autonomous negotiating trading ai agents are configured to pass, for each ai seller offer, buyer and seller price, price elasticity, product specs, product stock information, and other relevant parameters to the buyer machine learning training, validation, and execution neural network. The one or more buyer autonomous negotiating trading ai agents are configured to pass, for each ai seller offer, to the buyer machine learning training, validation, and execution neural network internet data including: user product reviews for vehicle parts; user reviews for vehicle fuel providers; user reviews for vehicle manufacturer models; and user reviews for vehicle service providers; new product or service announcements; vehicle model part lifespans; manufacturer vehicle model lifespans; or other product relevant data. Buyer autonomous vehicle negotiating/trading ai agents are configured to: estimate a time span for making a purchasing decision based on an expected remaining lifespan of the product; loop through all the one or more selling offers from the one or more seller negotiating/trading ai agents, pass the time span for making a decision to the buyer machine learning neural networks training, validation and execution and directly execute the decision from buyer machine learning neural networks training, validation and execution, whether to make a purchase or not to make a purchase; or establish two way communications with: the internet; the one or more seller machine learning neural networks, training, validation and execution; the one or more seller natural language processing (nlp) neural networks; the one or more buyer negotiating/trading ai agents; the one or more buyer machine learning neural networks, training, validation, and execution; one or more buyer natural language processing (nlp) neural networks; and the one or more cloud computing platforms; or establish two way communications with the one or more buyer autonomous vehicle negotiating/trading ai agents, where the one or more seller negotiating/trading ai agents include: seller vehicle part manufacturer reseller ai agents; seller fuel provider negotiating/trading ai agents; seller vehicle manufacturer reseller ai agents; or receive requests for one or more services from the one or more buyer autonomous vehicle negotiating/trading ai agents. The buyer machine learning training, validation, and execution negotiates a purchase price with the seller machine learning training, validation, and execution. The negotiations between the buyer machine learning training, validation, and execution and the seller machine learning training, validation, and execution is performed through a buyer natural language processing (nlp) neural network and a seller natural language processing (nlp) neural network. The one or more buyer autonomous vehicle negotiating/trading ai agents are configured to receive one or more advices from the one or more buyer machine learning neural networks training, validation and execution, whether to make a purchase or not to make a purchase. The one or more buyer machine learning neural networks training, validation, and execution use artificial intelligence machine learning architectures to make buying decisions, and natural language processing to negotiate with the one or more seller negotiating/trading ai agents. The one or more buyer machine learning neural networks, training, validation, and execution include one or more deep learning networks, where the one or more deep learning networks are co-operating with one of more reinforcement learning networks. One or more input of an input layer of one or more deep learning networks include at least one of: one or more product specs; product elasticity parameters; price elasticity parameters; historical sales and stock information for the one or more seller negotiating/trading ai agents; user reviews and consumer reports for vehicle parts, fuel providers, vehicle models, service providers; historical lifespans for vehicle parts; or other relevant data. The one or more deep learning networks make decisions to buy or not buy a product on behalf of the one or more buyer negotiating/trading ai agents. An output layer of one of more deep neural networks is making decisions of whether or not to make a purchase. One or more states of a reinforcement learning network include one or more input parameters of the one or more deep learning networks where the one or more input parameters include at least one of: product specs; product elasticity parameters; price elasticity parameters; historical sales and stock information for one or more seller negotiating/trading ai agents; user reviews and consumer reports for vehicle parts, fuel providers, vehicle models, service providers; historical lifespans for vehicle parts; or other relevant data. Rewards for each action for one or more states of one or more reinforcement learning networks are higher for actions achieving optimum times for making a decision to buy a product with the best historical lifespans, and close to a required product and price elasticity parameters. The maximum final reward is is achieved for making a buying decision for a product within a required product quality and elasticity parameters, and achieving, within a required time for making a buying decision, the lowest price or within a pre-specified percentage of the lowest historical prices, taking into consideration current markets trends, current competition and other relevant data. A final decision to buy or not to buy maximizes a present value of all subsequent rewards for each states and actions to buy or not to buy. The one or more deep learning networks make one or more decisions to sell or not sell a product on behalf of the one or more seller negotiating/trading ai agents. The one or more decisions constitutes at least two actions of the cooperation of the deep learning networks and the one or more reinforcement learning networks. One or more states of the reinforcement learning network include one or more input parameters of the one or more deep learning networks, where the one or more input parameters include at least one of: product specs; product elasticity parameters; price elasticity parameters; historical sales information for one or more of seller negotiating/trading ai agents; historical buying decisions of the one or more buyer negotiating/trading ai agents; user reviews and consumer reports for vehicle parts, fuel providers, vehicle models, service providers; historical lifespans for vehicle parts matching the requirements of the one or more buyer negotiating/trading ai; competitor price and products; or other relevant miscellaneous data. Rewards for each action for the one or more states of the one or more reinforcement learning networks are higher for actions achieving optimum times for making a decision to sell a product with best historical lifespans matching requirements of the one or more buyer negotiating/trading ai agents, and close to required product and price elasticity parameters. The maximum final reward is achieved for making a decision to sell a product within the required product quality and elasticity parameters of the one or more buyer negotiating/trading ai agents, and achieving, within a required time for making a decision to sell, at a higher sales price or within a pre-specified percentage of the highest historical sales prices, taking into consideration current markets trends, current product stock information, current competition and other relevant data. A final decision to sell or not to sell maximizes a present value of all subsequent rewards for each states and actions to sell or not to sell. The one or more buyer autonomous vehicle negotiating/trading ai agents are embedded and only executes one or more directions from the one or more buyer machine learning neural networks training, validation and execution, whether to make a purchase or not make a purchase. The one or more buyer autonomous vehicle negotiating/trading ai agents are configured to: accept a decision of the buyer machine learning neural networks training, validation and execution to make a purchase; or make a payment, create a navigation plan, a time plan, and an execution plan; store these plans in a vehicle memory; inform the vehicle owner; and execute this plan at an execution date. The one or more seller negotiating/trading ai agents are configured to: transmit offers for the one or more services to the one or more buyer autonomous vehicle negotiating/trading ai agents; or retrieve product price and quality elasticity parameters, sale targets, stock availability, margin targets, market trends, market demand and other relevant sales/purchase data; or receive one or more of internet data: user product reviews for vehicle parts; user reviews for vehicle fuel providers; user reviews for vehicle manufacturer models; and user reviews for vehicle service providers; new product or service announcements; vehicle model part lifespans; manufacturer vehicle model lifespans; market demands; trend analysis; consumer reports and other product relevant data. The seller machine learning training, validation, and execution negotiates a selling price with a buyer machine learning training, validation and execution. The negotiations between a seller machine learning training, validation, and execution and a buyer learning training, validation, and execution is performed through a seller natural language processing (nlp) neural network, and a buyer natural language processing (nlp) neural network. The one or more seller autonomous vehicle negotiating/trading ai agents are configured to receive one or more advices from the one or more seller machine learning neural networks training, validation, and execution, whether to make a sale or not make a sale. The one or more seller autonomous vehicle negotiating/trading ai agents are embedded and only executes one or more directions from the one or more seller machine learning neural networks training, validation and execution, whether to make a sale or not make a sale. The one or more seller autonomous vehicle negotiating/trading ai agents are configured to: estimate a time span for making a selling decision based stock availability, sales target and other relevant data; loop through all the one or more buying requests from the one or more buyer negotiating/trading ai agents, pass the time span for making a sale decision to the seller machine learning neural networks training, validation and execution and directly execute the decision from the seller machine learning neural networks training, validation and execution, whether to make a sale or not to make a sale; or receive a payment, and provide to the buyer autonomous vehicle negotiating/trading ai agents, sale date and directions to a vehicle part manufacturer/reseller, fuel provider, vehicle manufacturer, vehicle service provider providing the sale or service. The one or more seller machine learning neural networks training, validation, and execution use artificial intelligence machine learning architectures, to make selling decisions, and natural language processing to negotiate directly with the one or more buyer negotiating/trading ai agents. The one or more seller machine learning neural networks, training, validation, and execution include one or more deep learning networks, where the one or more deep learning networks are co-operating with one or more reinforcement learning networks. The one or more seller vehicle part manufacturers/resellers negotiating/trading ai agents use data sources including at least one of: their own collected data related to the various vehicle part manufacturers/resellers, data extracted from the internet or other data sources containing customer reviews, or reported quality, price, or value offered by the various vehicle part manufacturers/resellers, where the data sources are used within a data analytics, neural network or deep-learning framework, or any other neural network architecture to establish negotiating/trading strategies of selling vehicles or vehicle parts to the one or more buyer autonomous vehicle negotiating/trading ai agent(s). The one or more seller negotiating/trading ai agents use data sources including at least one of: their own collected data related to the various vehicle service providers, data extracted from an internet or other data sources containing customer reviews, or reported quality, price, or value offered by the various vehicle service providers, where the data sources are used within a data analytics, neural network or deep-learning framework, or any other neural network architecture to establish negotiating/trading strategies for selling services to the one or more buyer autonomous vehicle negotiating/trading ai agents. The one or more of the seller negotiating/trading ai agents use data sources including at least one of: their own collected data related to the various vehicle fuel providers, data extracted from an internet or other data sources containing customer reviews, or reported quality, price, or value offered by the various vehicle fuel providers, where the data sources are used within a data analytics, neural network or deep-learning framework, or any other neural network architecture to establish negotiating/trading strategies for selling fuel to the one or more buyer autonomous vehicle negotiating/trading ai agents. A vehicle computing device, a mobile device, or a cloud computational platform is configured to create one or more buyer autonomous vehicle negotiating/trading ai agents. The one or more buyer autonomous vehicle negotiating/trading ai agents use data sources including at least one of: their own collected data related to the various vehicle part manufacturers/resellers, data extracted from an internet or other data sources containing customer reviews, or reported quality, price, or value offered by the various vehicle part manufacturers/resellers, where the data sources are used within a data analytics, neural network or deep-learning framework, or any other neural network architecture to select a best part manufacturer/reseller in terms of price, quality, or value for the autonomous vehicle needed parts. The one or more buyer autonomous vehicle negotiating/trading ai agents: drive the vehicle autonomously or direct a driver to drive the autonomous vehicle on a specific date at a specific time to a chosen location for replacing the vehicle parts reaching an end of their lifespans; or drive the autonomous vehicle autonomously or direct a driver to drive the autonomous vehicle on a specific date and at a specific hour to a chosen service provider; or drive the autonomous vehicle autonomously or direct a driver to drive the autonomous vehicle on a specific date and at a specific hour to a chosen fuel provider; or drive the autonomous vehicle autonomously or direct a driver to drive the autonomous vehicle on a specific date and at a specific hour to test drive or buy a new/used vehicle. The one or more buyer autonomous vehicle negotiating/trading ai agents use data sources including at least one of: their own collected data related to the various vehicle service providers, data extracted from an internet or other data sources containing customer reviews, or reported quality, price, or value offered by the various vehicle service providers, where the data sources are used within a data analytics, neural network or deep-learning framework, or any other neural network architecture to select a best service provider in terms of price, quality, or value for the autonomous vehicle needed services. The one or more buyer autonomous vehicle negotiating/trading use data sources including at least one of: their own collected data related to the various vehicle fuel providers, data extracted from an internet or other data sources containing customer reviews, or reported quality, price, or value offered by the various vehicle fuel providers, where the data sources are used within a data analytics, neural network or deep-learning framework, or any other neural network architecture to select a best fuel provider in terms of price, quality, and value for the autonomous vehicle needed refueling. The one or more buyer autonomous vehicle negotiating/trading ai agents use data sources including at least one of: their own collected data related to the various new/used vehicle manufacturers/resellers, data extracted from an internet or other data sources containing customer reviews, or reported quality, price, or value offered by the various new/used vehicle manufacturer/resellers, where these data sources are used within a data analytics, neural network or deep-learning framework, or any network architecture to select a best new/used vehicle manufacturer/reseller in terms of price, quality, and value for a new/used autonomous vehicle needed. The one or more autonomous vehicle sensor health/fuel monitoring ai agents use in combination of one or more machine learning neural networks, one or more bayesian network (bn) methods to compute expected lifespans of the vehicle parts and the vehicle itself with inputs including at least one of: a priori probability of part failures; initial performance degradation rate; environmental depending diffusion coefficients; manufacturer experimental data; vehicle operation sensor data; vehicle part sensor data; reasonable expect data; or other relevant data related to a specific vehicle part or the vehicle itself. The one or more autonomous vehicle sensor health/fuel monitoring ai agents estimate new performance degradation parameters, remaining lifespan, and associated a-posteriori probabilities of parts or system failures. The one or more autonomous vehicle sensor health/fuel monitoring ai agents will use the estimated performance degradation parameters, associated the a-posteriori probabilities, and other relevant data, as inputs in a feed-back loop to improve accuracy of the expected lifespans computed by of the one or more autonomous vehicle sensor health/fuel monitoring ai agent(s). The one or more autonomous vehicle sensor health/fuel monitoring ai agents use one or more deep neural network or other neural network architectures in conjunction with or instead of the bayesian network(bn) methods to predict the remaining lifespans of vehicle parts, and the vehicle itself. The system where the one or more input layers for training the deep neural network include at least one of: part specification; historical degradation performance rate; historical environmental depending diffusion coefficients; manufacturer experimental data; historical vehicle operation sensor data; historical vehicle part sensor data; or other relevant data related to a specific vehicle part. The one or more output layers for training the deep neural network include at least one of historical lifespans with expected probabilities, derived from a bn network or other sources; maximum lifespans; or other relevant known output layer relevant and miscellaneous data. Known historical input and output data not used for training are used for the validation of the one or more deep neural networks. The one or more deep learning networks monitor performance of the one or more output layers, using observed output data which subsequently are used to train and validate in real-time the one or more deep learning neural networks. Digital readers are used to monitor vehicle fluid levels such as fuel level, break fuel level, oil level, wind shield wiper fuel level, and other fluid levels as the technology evolves. The one or more autonomous vehicle sensor health/fuel monitoring ai agents use data sources including at least one of: all vehicle sensor reported information, their own historical data related to the expected lifespan of the various vehicle parts, and data collected from the vehicle sensors, data extracted from an internet or other data sources containing customer reviews, or reported lifespan of the vehicle parts or quality of different brands of vehicle parts or vehicles, where the data sources are used within a data analytics, neural network or deep-learning framework to predict a remaining lifespan of vehicle parts, a remaining lifespan of the entire vehicle, and other relevant parameters. Implementations of the described techniques may include hardware, a method or process, or computer software on a computer-accessible medium.

After reading the foregoing specific configurations, architectures, and examples, one of ordinary skill will be able to affect various changes, substitutions of equivalents and various other embodiments as broadly disclosed therein. It is therefore intended that the protection granted hereon be limited only by the definition contained in the enclosed Claims and equivalents thereof.

What is claimed is:

1. An agent-based system for servicing a vehicle comprising:
 a vehicle autonomous AI agent associated with the vehicle, wherein the vehicle autonomous AI agent uses an artificial intelligence machine learning architecture comprising two deep neural networks with an input flat layer, a variable number of hidden layers wherein the last hidden layer comprises 2–n neurons; one action output layer connected to a reinforcement learning network to make a decision to purchase; not to purchase; to sell; or not to sell; when the first deep neural network is a buyer machine learning training, validation, and execution neural network and the second deep neural network is a seller machine learning training, validation, and execution neural network;

wherein the input flat layer consists of n-tuple state elements formed from part specs, product prices, product price elasticity scores, user review scores, part lifespans, model numbers, manufacturer expected lifespans, and service provider recommended lifespans forming an n-dimensional grid;

wherein the last hidden layer provides the probabilities for moving optimally within the n-dimensional grid;

wherein the deep neural network is trained to follow the path of high probabilities within the n-dimensional grid that will achieve the best price at the stopping time (time of purchase or sell), using a reward function inversely proportional to the intended purchase or sell price so that the closer to the intended purchase or sell price, the higher the reward, with the intended price being the best historical purchase or sell price, to make decisions and negotiate with other autonomous AI agents, each of the other autonomous AI agents having the same AI architecture as the vehicle autonomous AI agent, wherein the other autonomous AI agents include buyer autonomous negotiating AI agents and seller autonomous negotiating AI agents;

an actuator within the vehicle, in communication with the vehicle autonomous AI agent, wherein the vehicle autonomous AI agent receives actuator information from the actuator and provides actuator instructions to the actuator;

a sensor within the vehicle, in communication with the vehicle autonomous AI agent, wherein the vehicle autonomous AI agent receives sensor information from the sensor;

wherein, in response to actuator information received from the actuator and sensor information received from the sensor, the vehicle autonomous AI agent determines a need for vehicle maintenance using a deep neural network with one input layer, n-hidden layers, and one output layer; with the input layer consisting of part specifications, sensor real-time recorded data, and user reviews; and the output layer consisting of the expected lifespan and the maximum lifespan; wherein the deep neural network is trained using sensor part specifications, user review scores, and sensor historical data for the input layer and the observed expected and trained using maximum lifespans for the output layer; and wherein the vehicle autonomous AI agent communicates with a seller autonomous negotiating AI agent, located outside of the vehicle, to negotiate a vehicle maintenance schedule for the vehicle;

wherein, when the vehicle maintenance schedule has been negotiated, the vehicle autonomous AI agent purchases vehicle maintenance associated with the vehicle maintenance schedule for the vehicle; and wherein, the vehicle autonomous AI agent communicates instructions to the vehicle to collect the vehicle maintenance in accordance with the vehicle maintenance schedule.

2. The system of claim 1, wherein the vehicle autonomous AI agent autonomously monitors a condition of a vehicle part and predicts a time when service vehicle maintenance is required.

3. The system of claim 2, wherein the input layer of the vehicle autonomous AI agent consists of parameters associated with a vehicle part, wherein the vehicle part is a tire, oil, brakes, fuel, a battery, or a transmission.

4. The system of claim 3, wherein the input layer of the vehicle autonomous AI agent includes historical and real-time recorded data associated with the vehicle parts including:
   conditions of the tires comprising: tire pressure or tread thickness;
   conditions of the oil comprising oil fuel level, oil quality, oil conductivity, oil thickness, or soot concentration;
   conditions of one or more brakes comprising brake pad thickness, brake rotor thickness, brake fluid resistance, or brake fluid level capacitance;
   conditions of the fuel comprising fuel level, fuel resistance, or fuel level capacitance;
   conditions of a battery comprising: cell circuit current levels, cell voltage levels, or cell temperature; and
   conditions of a transmission comprising: shaft speed data, clutch/brake data, or turbine data.

5. The system of claim 1, wherein the vehicle autonomous AI agent is executed on a vehicle computing device, a mobile device, or a cloud computational platform.

6. The system of claim 1, wherein one of the other autonomous AI agents is executed on a mobile device or a cloud computational platform.

7. The system of claim 1, wherein the vehicle autonomous AI agent and one of the other autonomous AI agent communicate via an internet.

8. The system of claim 1, wherein the vehicle autonomous AI agent is configured to establish two way communications with one of the other AI autonomous agent.

9. The system of claim 1, wherein the vehicle autonomous AI agent includes a vehicle buyer autonomous negotiating AI agent.

10. The system of claim 9, wherein the vehicle buyer autonomous negotiating AI agent is configured to establish two-way communications with a vehicle owner for information of any pending buying execution plans.

11. The system of claim 9, wherein the vehicle buyer autonomous negotiating AI agent is configured to receive:
   data showing that the service is required;
   a selling offer from a seller autonomous negotiating AI agent; and
   internet data including: user product reviews for vehicle parts; user reviews for vehicle fuel providers; user reviews for vehicle manufacturer models; and user reviews for vehicle service providers; new product or service announcements; vehicle model part lifespans; and manufacturer vehicle model lifespans.

12. The system of claim 9, wherein the vehicle buyer autonomous negotiating AI agent is configured to retrieve product price and quality elasticity parameters from a user database.

13. The system of claim 9, wherein the vehicle buyer autonomous negotiating trading AI agent is configured to loop through multiple selling offers from one or more seller autonomous negotiating AI agents.

14. The system of claim 13, wherein the vehicle buyer autonomous negotiating AI agent is configured to pass, for each of the multiple seller offers, buyer and seller price, price elasticity, product specs, product and stock information to a buyer machine learning training, validation, and execution neural network.

15. The system of claim 14, wherein the vehicle buyer autonomous negotiating AI agent is configured to pass, for each of the multiple seller offers, to the buyer machine learning training, validation, and execution neural network internet data including: user product reviews for vehicle parts; user reviews for vehicle fuel providers; user reviews for vehicle manufacturer models; and user reviews for vehicle service providers; new product or service announcements; vehicle model part lifespans; and manufacturer vehicle model lifespans.

16. The system of claim 14, wherein the buyer machine learning training, validation, and execution neural network negotiates a purchase price with a seller machine learning training, validation, and execution neural network.

17. The system of claim 16, wherein the negotiations between the buyer machine learning training, validation, and execution neural network and the seller machine learning training, validation, and execution neural network is performed through a buyer Natural Language Processing (NLP) neural network and a seller Natural Language Processing (NLP) neural network.

18. The system of claim 9, wherein the buyer autonomous vehicle negotiating AI agent is configured to receive advice from a buyer machine learning neural networks training, validation, and execution neural network, whether to make a purchase or not to make a purchase.

19. The system of claim 9, wherein the vehicle buyer autonomous vehicle negotiating/trading AI agent executes directions from a buyer machine learning neural networks training, validation, and execution neural network, whether to make a purchase or not make a purchase.

20. The system of claim 9, wherein the buyer autonomous vehicle negotiating AI agent is configured to:
  accept a decision of a buyer machine learning neural networks training, validation, and execution neural network to make a purchase; or
  make a payment, create a navigation plan, a time plan, and an execution plan; store these plans in a vehicle memory; inform the vehicle owner; and execute this plan at an execution date.

* * * * *